United States Patent
Koponen et al.

(10) Patent No.: US 9,985,896 B2
(45) Date of Patent: May 29, 2018

(54) CACHING OF SERVICE DECISIONS

(71) Applicant: Nicira, Inc., Palo Alto, CA (US)

(72) Inventors: Teemu Koponen, San Francisco, CA (US); Ethan J. Jackson, San Francisco, CA (US)

(73) Assignee: NICIRA, INC., Palo Alto, CA (US)

(*) Notice: Subject to any disclaimer, the term of this patent is extended or adjusted under 35 U.S.C. 154(b) by 567 days.

(21) Appl. No.: 14/574,335

(22) Filed: Dec. 17, 2014

(65) Prior Publication Data
US 2015/0281125 A1    Oct. 1, 2015

Related U.S. Application Data

(60) Provisional application No. 61/973,255, filed on Mar. 31, 2014.

(51) Int. Cl.
*H04L 12/851* (2013.01)
*G06F 12/0811* (2016.01)
(Continued)

(52) U.S. Cl.
CPC ...... *H04L 47/2441* (2013.01); *G06F 12/0811* (2013.01); *G06F 12/128* (2013.01);
(Continued)

(58) Field of Classification Search
CPC ....... H04L 45/38; H04L 45/586; H04L 45/64; H04L 45/02; H04L 45/745;
(Continued)

(56) References Cited

U.S. PATENT DOCUMENTS 6,118,760 A    9/2000    Zaumen et al.
6,633,565 B1    10/2003    Bronstein et al.
(Continued)

FOREIGN PATENT DOCUMENTS

WO    WO 2014/126387    8/2014

OTHER PUBLICATIONS

Nygren, Anders, et al., "OpenFlow Switch Specification," Oct. 14, 2013, 206 pages, Version 1.4.0, The Open Networking Foundation.
(Continued)

*Primary Examiner* — Ricky Ngo
*Assistant Examiner* — Richard Chang
(74) *Attorney, Agent, or Firm* — Adeli LLP

(57) ABSTRACT

Some embodiments provide a method for processing a packet received by a managed forwarding element. The method performs a series of packet classification operations based on header values of the received packet. The packet classifications operations determine a next destination of the received packet. When the series of packet classification operations specifies to send the packet to a network service that performs payload transformations on the packet, the method (1) assigns a service operation identifier to the packet that identifies the service operations for the network service to perform on the packet, (2) sends the packet to the network service with the service operation identifier, and (3) stores a cache entry for processing subsequent packets without the series of packet classification operations. The cache entry includes the assigned service operation identifier. The network service uses the assigned service operation identifier to process packets without performing its own classification operations.

20 Claims, 19 Drawing Sheets

(51) Int. Cl.
*G06F 12/128* (2016.01)
*H04L 12/911* (2013.01)
*H04L 12/861* (2013.01)
*H04L 12/715* (2013.01)
*H04L 12/751* (2013.01)
*H04L 12/741* (2013.01)
*H04L 12/721* (2013.01)

(52) U.S. Cl.
CPC .............. *H04L 45/02* (2013.01); *H04L 45/64* (2013.01); *H04L 45/745* (2013.01); *H04L 47/827* (2013.01); *H04L 49/9042* (2013.01); *G06F 2212/283* (2013.01); *G06F 2212/69* (2013.01); *H04L 45/38* (2013.01)

(58) Field of Classification Search
CPC ............... H04L 47/2441; H04L 47/827; H04L 49/9042; G06F 12/128; G06F 12/0811; G06F 2212/283; G06F 2212/69
See application file for complete search history.

(56) References Cited

U.S. PATENT DOCUMENTS

| | | |
|---|---|---|
| 9,036,636 B1 | 5/2015 | Sherwood et al. |
| 9,042,234 B1 | 5/2015 | Liljenstolpe et al. |
| 9,203,771 B1 | 12/2015 | Cai et al. |
| 9,244,843 B1 | 1/2016 | Michels et al. |
| 2002/0089931 A1 | 7/2002 | Takada et al. |
| 2003/0214948 A1 | 11/2003 | Jin et al. |
| 2007/0192543 A1 | 8/2007 | Naik et al. |
| 2009/0138577 A1 | 5/2009 | Casado et al. |
| 2009/0161547 A1* | 6/2009 | Riddle .................... G06F 9/526 370/236 |
| 2011/0164503 A1 | 7/2011 | Yong et al. |
| 2013/0163427 A1 | 6/2013 | Beliveau et al. |
| 2014/0098669 A1 | 4/2014 | Garg et al. |
| 2014/0226661 A1 | 8/2014 | Mekkattuparamban et al. |
| 2014/0280822 A1* | 9/2014 | Chennimalai Sankaran ........... H04L 41/5022 709/223 |
| 2014/0369348 A1* | 12/2014 | Zhang .................. H04L 45/121 370/389 |
| 2015/0169457 A1 | 6/2015 | Jackson et al. |
| 2015/0281098 A1 | 10/2015 | Pettit et al. |

OTHER PUBLICATIONS

Curtis, Andrew R., et al., "DevoFlow: Scaling Flow Management for High-Performance Networks," SIGCOMM '11, Aug. 15-19, 2011, pp. 254-265, ACM.

Matsumoto, Nobutaka, et al., "LightFlow: Speeding Up GPU-based Flow Switching and Facilitating Maintenance of Flow Table," 2012 IEEE 13$^{th}$ International Conference on High Performance Switching and Routing, Jun. 24, 2012, pp. 76-81, IEEE.

Tung, Ye, "A flow catching mechanism for fast packet forwarding," Computer Communications, Apr. 19, 2001, pp. 1-6, Elsevier.

Zadnik, Martin, et al., "Evolution of Cache Replacement Policies to Track Heavy-hitter Flows," ANCS '10, Oct. 25-26, 2010, 2 pages, ACM.

* cited by examiner

CACHING OF SERVICE DECISIONS

BACKGROUND

Packet processing can be modeled as a sequence of classification operations and actions. Classification operations involve matching a packet against a flow table to identify a highest priority match, which specifies the actions to execute for the packet: how to modify packet headers, where to send the packet, to which classification stage to proceed next, or whether to drop the packet.

With the above model in mind, standard L2 and L3 network forwarding operations can be modeled as a sequence of classification operations and their corresponding actions: classifications are either about matching over L2 destination MAC address or doing a longest prefix matching over the destination IP address. More complicated matching may be incorporated, to include chaining classifications to simulate arbitrary L2/L3 topologies, policy routing that matches over arbitrary fields, and using other packet header fields to implement ACLs.

The classification and actions operate over only the standard packet headers in a stateless manner, and do not inspect payload. Thus, all packets with similar packet headers will receive similar treatment; to accommodate middlebox services that can modify the payload or perform other stateful operations, actions may be included that send the packet to such services.

Implementing such a packet processing pipeline in software (e.g., in a software virtual switch) utilizes CPU resources for four types of tasks moving packets from the NIC(s) through the layers of operating system software into the classification and back to the NIC(s) for sending out packets classification of packets (i.e., identifying the actions to execute)

executing the packet header field transformations based on the identified actions executing services (i.e., applying payload transformations)

Moving of packets between the NIC(s) and the software is primarily dealt with using principles demonstrated by dpdk (a Linux library for packet processing), netmap, and pf_ring. That is, the software layers between the NIC and the classification pipeline are mostly removed. Similar principles apply to the execution of the packet header field transformations: memory accesses should be minimized, packet copies removed, memory allocated proactively, and locality of execution guaranteed through a run-to-completion model, by processing a single packet using a single CPU core, without threading or process context switches, merely as a chain of function invocations, before sending the packet further along.

However, classification and the execution of services need to be implemented in a more efficient manner. Classification on a general purpose CPU using standard DRAM (e.g., on a standard x86 machine) is computationally expensive, which is why special purpose network appliances use specialized memory chips (e.g., TCAM and CAMs). For arbitrarily large logical topologies, the number of classification operations required corresponds to the complexity of the logical topology and its configuration (e.g., ACLs, etc.). For more complex configurations, more classification operations are required, which use more computing resources.

BRIEF SUMMARY

Some embodiments provide a managed forwarding element with a hierarchy of cached flow entries for processing packets. Specifically, some embodiments include an exact match cache, an aggregate flow cache, and a set of staged flow tables for full classification operations. The managed forwarding element, upon receiving a packet, first checks for a match in the exact match cache, then (if no match is found) checks the aggregate flow cache, and only performs the full classification operations using the staged flow tables if no matching flow entry is found in either of the caches.

In some embodiments, the managed forwarding element operates within the virtualization software of a host machine (e.g., within the hypervisor) and includes a kernel and a user space. Some embodiments cache the exact match and aggregate flow entries in the kernel, at which packets are initially received. Only if no match is found in the cached flow entries of the kernel is the packed sent to a user space module for processing. The result of the processing through the staged flow tables in the user space is then cached in the kernel for application to subsequent packets. As the kernel processing is significantly faster and uses cached decisions that do not require numerous lookups over several stages, the use of the caches saves significant time for subsequent packets as compared to performing a full user space classification for each packet.

A flow entry in the exact match cache, in some embodiments, matches only packets with the exact same header values as the first packet the processing of which resulted in the generation of the flow entry (e.g., only packets from the same data flow as the first packet). On the other hand, an aggregate cache flow entry includes one or more of the header fields wildcarded, and thus matches packets from any of a class of similar data flows (as one example, packets that have the same physical ingress port and destination IP address, but may have different transport protocols, source transport port number, and/or destination transport port numbers). When a packet is processed by the full set of staged flow tables, some embodiments keep track of the header fields that are used to match the flow entries, and wildcard the rest of the header fields for the aggregate cache entries. Thus, any subsequent packets with the same values for the set of header fields used to match the flow entries in the flow tables will match the aggregate cache flow entry.

Some embodiments also generate an exact match flow entry for a packet processed by the full set of flow tables. In this case, the second and subsequent packets in that data flow will be processed by the exact match flow entry, while the first packet in a similar data flow will be processed by the aggregate cache entry. Other embodiments, however, only generate the aggregate cache flow entry from the full set of flow tables. When a packet does not match any entry in the exact match cache but does match an aggregate cache entry, some embodiments generate a new entry for the exact match cache, such that the subsequent packets in that particular data flow will be processed by the new exact match flow entry. Thus, in some embodiments, the first packet in a data flow will be processed by the full set of staged flow tables, the second packet will be processed by the newly-generated aggregate cache flow entry, and the subsequent packets will be processed by the exact-match cache flow entry generated from the aggregate cache flow entry.

In addition, some embodiments use a delineation between classification operations and service operations that minimizes the classification operations necessary. In some embodiments, classification operations involve the matching of packet headers (e.g., L2 and L3 headers) to flow entries that specify actions to take on a packet (e.g., drop the packet, modify a header field and resubmit the packet, send the packet to a particular port, etc.) when the match conditions for a flow entry are met by the packet. The service operations, in some embodiments, may modify the header values in some cases, but may also inspect and/or modify the payload of the packet (which includes any L4-L7 headers) and may keep track of state for a data flow.

Typically, service modules will perform their own classification operations in order to determine how to process a received packet and/or to determine the connection state for the packet. However, this requires similar computationally-intensive processing to the classification operations of the managed forwarding element described above (e.g., lookups over the packet headers, possibly in multiple stages). Accordingly, some embodiments utilize the flow entry caches of the managed forwarding element to perform the classification operations required for the service modules.

When the result of a set of classification operations performed using the flow tables specifies to send a packet to the service module, some embodiments also ensure that the classification operations determine what operations the service module will perform on the packet (i.e., the classification operations that would otherwise be performed by the service module). The classifier of the managed forwarding element can therefore store an identifier with the packet that conveys this information to the service module when the service module receives the packet. In addition, in some embodiments, the classifier assigns a connection-specific identifier to the packet as well. This enables the service module to store connection-specific state for the data flow that is linked to the connection identifier.

In such embodiments, an aggregate cache flow entry may encompass the service module-related classification operations, and would specify the actions for the service module to perform on a packet that matches the aggregate flow entry (i.e., the first packet of a new connection). In addition, when a packet matches an aggregate cache flow entry, a new connection identifier would be assigned to the packet.

Exact-match cache entries would also be created for such packets, to store the connection identifier on the classification side. Using these entries, some embodiments embed the connection identifier in subsequent packets for a connection that match the exact-match entry. The service module can then match the connection identifier of a received packet to its stored state for that connection without performing any classification operations, thereby saving computations resources for the host machine.

In some embodiments, the service module performs a custom action for the managed forwarding element and is part of the managed forwarding element or at least operates on the same physical host machine as the managed forwarding element (e.g., in the user space of the virtualization software). For some such embodiments, the managed forwarding element creates a packet object upon receiving the packet and beginning its processing, and stores the service operation identifier to this packet object (e.g., as a field of the object). The packet object can then be passed to the service module on the host machine for processing according to the service operation identifier. On the other hand, when the service operates on a separate machine, either the service performs its own classification operations or the identifier must be embedded in the packet sent over the physical network to the service.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

Figure 1:
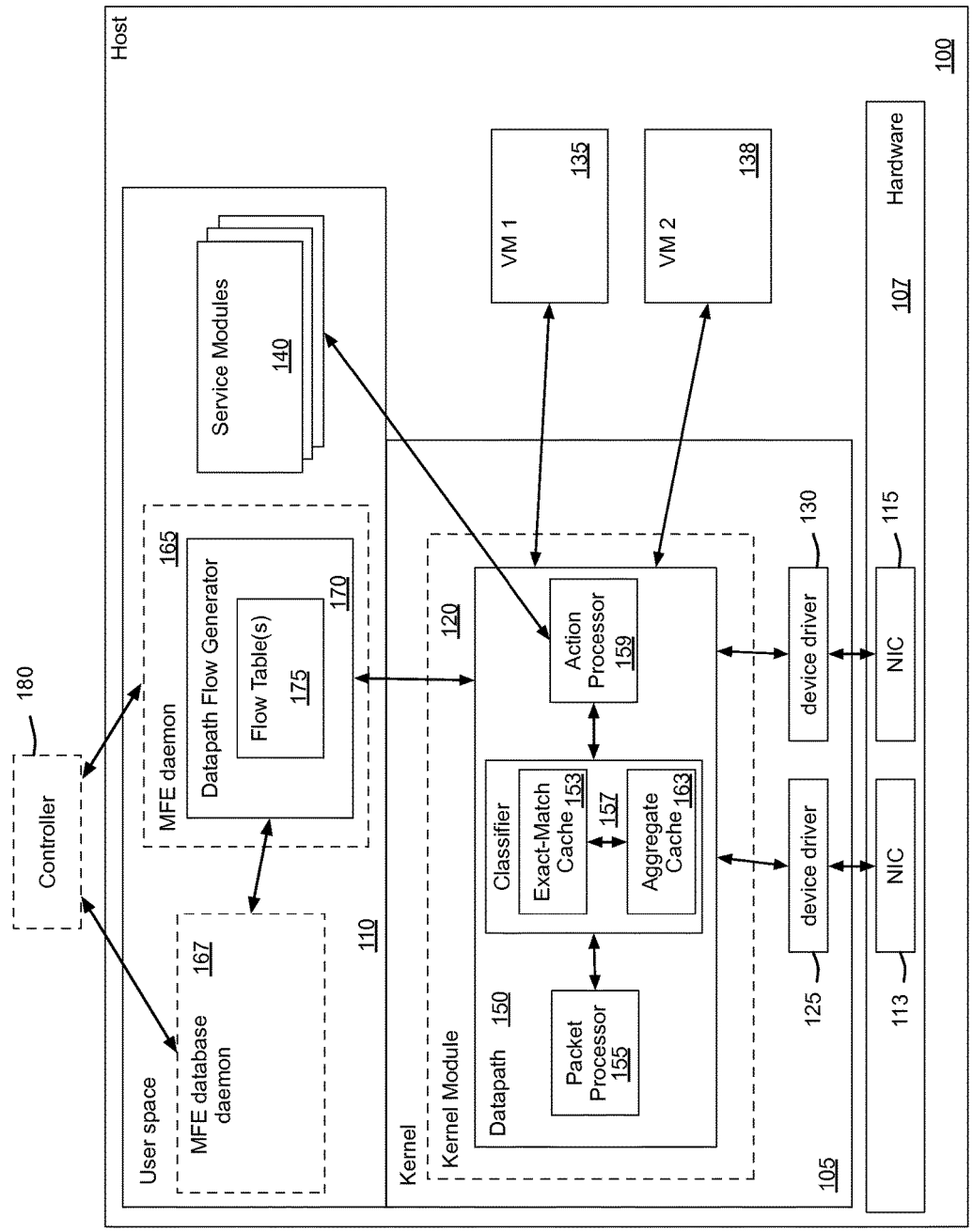
FIG. 1 conceptually illustrates an architectural diagram of a host machine on which a software-implemented MFE of some embodiments is implemented.

In the following detailed description of the invention, numerous details, examples, and embodiments of the invention are set forth and described. However, it should be understood that that the invention is not limited to the embodiments set forth and that the invention may be practiced without some of the specific details and examples discussed.

Some embodiments provide a managed forwarding element with a hierarchy of cached flow entries for processing packets. Specifically, some embodiments include an exact match cache, an aggregate flow cache, and a set of staged flow tables for full classification operations. The managed forwarding element, upon receiving a packet, first checks for a match in the exact match cache, then (if no match is found) checks the aggregate flow cache, and only performs the full classification operations using the staged flow tables if no matching flow entry is found in either of the caches.

In some embodiments, the managed forwarding element operates within the virtualization software of a host machine (e.g., within the hypervisor) and includes a kernel and a user space. Some embodiments cache the exact match and aggregate flow entries in the kernel, at which packets are initially received. Only if no match is found in the cached flow entries of the kernel is the packed sent to a user space module for processing. The result of the processing through the staged flow tables in the user space is then cached in the kernel for application to subsequent packets. As the kernel processing is significantly faster and uses cached decisions that do not require numerous lookups over several stages, the use of the caches saves significant time for subsequent packets as compared to performing a full user space classification for each packet.

A flow entry in the exact match cache, in some embodiments, matches only packets with the exact same header values as the first packet the processing of which resulted in the generation of the flow entry (e.g., only packets from the same data flow as the first packet). On the other hand, an aggregate cache flow entry includes one or more of the header fields wildcarded, and thus matches packets from any of a class of similar data flows (as one example, packets that have the same physical ingress port and destination IP address, but may have different transport protocols, source transport port number, and/or destination transport port numbers). When a packet is processed by the full set of staged flow tables, some embodiments keep track of the header fields that are used to match the flow entries, and wildcard the rest of the header fields for the aggregate cache entries. Thus, any subsequent packets with the same values for the set of header fields used to match the flow entries in the flow tables will match the aggregate cache flow entry.

Some embodiments also generate an exact match flow entry for a packet processed by the full set of flow tables. In this case, the second and subsequent packets in that data flow will be processed by the exact match flow entry, while the first packet in a similar data flow will be processed by the aggregate cache entry. Other embodiments, however, only generate the aggregate cache flow entry from the full set of flow tables. When a packet does not match any entry in the exact match cache but does match an aggregate cache entry, some embodiments generate a new entry for the exact match cache, such that the subsequent packets in that particular data flow will be processed by the new exact match flow entry. Thus, in some embodiments, the first packet in a data flow will be processed by the full set of staged flow tables, the second packet will be processed by the newly-generated aggregate cache flow entry, and the subsequent packets will be processed by the exact-match cache flow entry generated from the aggregate cache flow entry.

In addition, some embodiments use a delineation between classification operations and service operations that minimizes the classification operations necessary. In some embodiments, classification operations involve the matching of packet headers (e.g., L2 and L3 headers) to flow entries that specify actions to take on a packet (e.g., drop the packet, modify a header field and resubmit the packet, send the packet to a particular port, etc.) when the match conditions for a flow entry are met by the packet. The service operations, in some embodiments, may modify the header values in some cases, but may also inspect and/or modify the payload of the packet (which includes any L4-L7 headers) and may keep track of state for a data flow.

Typically, service modules will perform their own classification operations in order to determine how to process a received packet and/or to determine the connection state for the packet. However, this requires similar computationally-intensive processing to the classification operations of the managed forwarding element described above (e.g., lookups over the packet headers, possibly in multiple stages). Accordingly, some embodiments utilize the flow entry caches of the managed forwarding element to perform the classification operations required for the service modules.

When the result of a set of classification operations performed using the flow tables specifies to send a packet to the service module, some embodiments also ensure that the classification operations determine what operations the service module will perform on the packet (i.e., the classification operations that would otherwise be performed by the service module). The classifier of the managed forwarding element can therefore store an identifier with the packet that conveys this information to the service module when the service module receives the packet. In addition, in some embodiments, the classifier assigns a connection-specific identifier to the packet as well. This enables the service module to store connection-specific state for the data flow that is linked to the connection identifier.

In such embodiments, an aggregate cache flow entry may encompass the service module-related classification operations, and would specify the actions for the service module to perform on a packet that matches the aggregate flow entry (i.e., the first packet of a new connection). In addition, when a packet matches an aggregate cache flow entry, a new connection identifier would be assigned to the packet.

Exact-match cache entries would also be created for such packets, to store the connection identifier on the classification side. Using these entries, some embodiments embed the connection identifier in subsequent packets for a connection that match the exact-match entry. The service module can then match the connection identifier of a received packet to its stored state for that connection without performing any classification operations, thereby saving computations resources for the host machine.

In some embodiments, the service module performs a custom action for the managed forwarding element and is part of the managed forwarding element or at least operates on the same physical host machine as the managed forwarding element (e.g., in the user space of the virtualization software). For some such embodiments, the managed forwarding element creates a packet object upon receiving the packet and beginning its processing, and stores the service operation identifier to this packet object (e.g., as a field of the object). The packet object can then be passed to the service module on the host machine for processing according to the service operation identifier. On the other hand, when the service operates on a separate machine, either the service performs its own classification operations or the identifier must be embedded in the packet sent over the physical network to the service.

The above description introduces the cache hierarchy of some embodiments for a managed forwarding element. Several more detailed embodiments are described below. First, Section I introduces the architecture of a managed forwarding element of some embodiments. Section II then describes the cache hierarchy in detail, while Section III describes the use of the cache hierarchy for packets that are processed by network services. Finally, Section IV describes an electronic system with which some embodiments of the invention are implemented.

I. Managed Forwarding Element Architecture

In some embodiments, as indicated above, the packet processing operations (e.g., classification operations, forwarding actions, etc.) are performed by a managed forwarding element (MFE) that operates as a software forwarding element. Open vSwitch (OVS) is an example of a flow entry-based software forwarding element. In some embodiments, MFEs operate on host machines that host virtual machines or other data compute nodes that serve as the sources and destinations for packets (e.g., in the virtualization software of such a host machine). For example, a MFE might operate on a host machine that hosts virtual machines for several different logical networks, and would implement the several logical networks for each of the virtual machines residing on the host.

FIG. 1 conceptually illustrates an architectural diagram of a host machine 100 on which a software-implemented MFE of some embodiments is implemented. In some embodiments, the MFE is implemented in the virtualization software (e.g., in the hypervisor) of the host 100. In this example, the MFE includes several components, including a kernel module or datapath 120 (operating in the virtualization software kernel 105) as well as a MFE daemon 165 and MFE database daemon 167 (both of which operate in the user space 110 of the virtualization software).

While this figure and the accompanying descriptions (as well as the subsequent FIGS. 3-7 and 10-14) show the datapath (i.e., the parsing and extraction of packet headers, the lookups against cached flow entries, and the execution of actions on the packets) operating in the kernel, it should be understood that these could also take place in the userspace in some embodiments. That is, in some embodiments, all three layers of the packet classification hierarchy (exact-match cache, aggregate cache, and staged forwarding tables) run in the userspace (possibly within a single userspace process).

As shown in FIG. 1, the host 100 includes hardware 107 (though this is a software architecture diagram, the hardware 107 is displayed in order to represent the NICs 113 and 115 of the host machine), virtualization software kernel 105, virtualization software user space 110, and two VMs 135 and 138. The hardware 107 may include typical computer hardware (e.g., processing units, volatile memory (e.g., RAM), nonvolatile memory (e.g., hard disk, optical disks, solid-state memory, etc.), network adapters, etc. As shown, the hardware 107 also includes network interface controllers (NICs) 113 and 115 for connecting a computing device to a network.

The virtualization software that includes the kernel 105 and user space 110 is a software abstraction layer that operates on top of the hardware 107 and below any operating system in some embodiments. In some embodiments, the kernel 105 performs virtualization functionalities (e.g., to virtualize the hardware 107 for several virtual machines operating on the host machine). The kernel 105 handles various management tasks, such as memory management, processor scheduling, or any other operations for controlling the execution of the VMs 135 and 138 operating on the host machine.

As shown, the kernel 105 includes device drivers 125 and 130 for the NICs 113 and 115, respectively. The device drivers 125 and 130 allow an operating system to interact with the hardware of the host 100. The VMs 135 and 138 are independent virtual machines operating on the host 10, and may run any number of different operating systems (e.g., Linux, Solaris, FreeBSD, or any other type of UNIX based operating system, Windows-based operating systems, etc.). While this figure shows an example in which the MFE operates within the virtualization software of the host and the VMs 135 and 138 operate on top of that virtualization software, it should be understood that the caching hierarchy is equally possible in embodiments in which the MFE is not part of any virtualization software (e.g., in non-virtualized environments). In some such embodiments, no virtualization software is present on the host machine, and thus VMs are not present (instead, packets may simply be forwarded between NICs.

The user space 110 of the virtualization software includes the MFE daemon 165 and the MFE database daemon 167, as well as a set of service modules 140. The MFE daemon 165 is an application that runs in the background of the user space 110. The MFE daemon 165 of some embodiments receives configuration data from the network controller 180 (which may be a chassis controller operating on the host, or a network controller operating on a separate physical machine to manage several host machines) and the MFE database daemon 167. For instance, from the controller, the MFE daemon 165 of some embodiments receives generated flow entries that specify packet processing operations to apply to packets when the packets match a set of conditions. The MFE daemon 165 stores the received flow entries in the flow tables 175. In some embodiments, the flow tables are organized in stages (e.g., stages of packet processing), with one or more stages for each of several logical forwarding elements. For instance, a logical switch might have an ingress mapping stage, an ingress ACL stage, a logical forwarding stage, an egress ACL stage, etc.). For a MFE implementing multiple logical networks, each of the logical networks has several stages of flow tables in some embodiments.

In some embodiments, the MFE daemon 165 communicates with the network controller 180 using the OpenFlow Protocol, while the MFE database daemon 167 communicates with the network controller 165 through a database communication protocol (e.g., OVSDB protocol). The database protocol of some embodiments is a JavaScript Object Notation (JSON) remote procedure call (RPC) based protocol.

The MFE database daemon 167 is also an application that runs in the background of the user space 110 in some embodiments. The MFE database daemon 167 of some embodiments communicates with the network controller 180 in order to configure certain aspects of the MFE (e.g., of the MFE daemon 165 and/or the kernel module 120) other than the installation of flow entries. For instance, the MFE database daemon 167 receives management information from the network controller 180 for configuring bridges, ingress ports, egress ports, QoS configurations for ports, etc., and stores the information in a set of databases that help define the configuration of the MFE.

As illustrated in FIG. 1, the kernel 105 includes the kernel module 120. This module processes and forwards network data (e.g., packets) between VMs running on the host 100 and network hosts external to the host (e.g., network data received through the NICs 113 and 115). In some embodiments, the VMs 135 and 138 running on the host 100 couple to the kernel module through a datapath 150.

In some embodiments, the datapath 150 manages a set of rules (e.g., flow entries) that specify operations for processing and forwarding packets. The datapath 150 communicates with the MFE daemon 165 in order to process and forward packets that the datapath 150 receives. In the example of FIG. 1, the datapath 150 includes a packet processor 155, a classifier 157, and an action processor 159. The packet processor 155 receives a packet and parses the packet to strip header values. The packet processor 155 can perform a number of different operations. For instance, in some embodiments, the packet processor 155 is a network stack that is associated with various network layers to differently process different types of data that it receives. Irrespective of all the different operations that it can perform, the packet processor 155 passes the header values to the classifier 157. In some embodiments, the packet processor stores these header values in one or more registers that are stored for a packet. In some embodiments, the packet processor 155 defines an object for the packet that includes the registers. The packet object is then used to represent the packet in the MFE.

The classifier 157 accesses one or more datapath caches 163 (also referred to as a flow cache) to find matching flow entries for different packets. In some embodiments, as shown in the figure, the classifier includes two types of flow cache, an aggregate cache 163 and an exact-match cache 153. The exact-match cache 153 of some embodiments contains flow entries that are matched by packets having a unique set of header values (i.e., packets from a specific data flow or connection). In some embodiments, the flow entries in the exact-match cache 153 are installed by the classifier 157 based on (i) processing of a packet through the set of flow tables 175 by the MFE daemon 165 or (ii) processing of a packet according to a matched flow entry in the aggregate cache 163. The aggregate cache 163 contains flow entries, each of which is matched by packets falling into a particular traffic aggregate class. That is, each of the flow entries in the aggregate cache 163 specifies a subset of the packet header values for which it requires a match, with the other packet header fields being wildcarded (i.e., a packet can match the flow entry while having any values for the wildcarded fields). In some embodiments, the flow entries in the aggregate cache 163 are installed by the classifier 157 based on processing of a packet through the set of flow tables 175 by the MFE daemon 165.

When the classifier 157 receives the header values for a packet, it first performs a lookup on the exact-match cache 153 to find a flow entry matched by the packet. When none is found, the classifier 157 next performs a lookup on the aggregate cache 163 to find a matching flow entry there. When no matching flow entries can be found (i.e., for the first packet of a data flow is different enough from the previously-received data flows so that the packet does not match any of the flow entries in the aggregate cache 163), the MFE shifts control of the packet processing to the MFE Daemon 165 for a full set of packet processing operations (i.e., executing of numerous lookup stages over the flow tables 175, which is more computationally expensive). One primary distinction between the caches 153 and 163 and the set of flow tables 175 is that there is at most only one matching flow entry in each of the two fast path caches (only one of which will actually be matched by the flow entry, based on the hierarchy of traversal through the caches). The cached flow entries specify all of the actions to take in order to process the packet, whereas each of the flow entries in the tables 175 only specify the actions for that stage, often specifying a resubmit action for processing by the next packet processing stage.

If the classifier 157 finds a matching flow entry in one of the caches, the action processor 159 receives the packet and performs a set of actions specified by the matching flow entry. When a packet requires processing by the MFE daemon 165, the action processor 159 of some embodiments receives, from the MFE daemon 165, the packet and a set of instructions for actions to perform on the packet.

The MFE daemon 165 of some embodiments includes a datapath flow generator 170. The datapath flow generator 170 is a component of the MFE that makes forwarding and other packet processing decisions. For any packet that is not matched in the datapath caches 153 and 163 (e.g., because the packet is the first in a new transport-layer connection), the datapath flow generator 170 performs the one or more flow table lookups required to process the packet, and then generates new flow entries to install in the caches 153 and 163. In some embodiments, the datapath flow generator 170 includes or works in conjunction with a separate classifier (not shown) in order to find one or more matching flow entries in the flow tables 175. Unlike the classifier 157, the MFE daemon 165 may perform one or more resubmits (i.e., be resubmitted back to the classifier with packet data modified based on actions performed by previous matched flow entries).

In some embodiments, a matched flow entry stored in the flow table 175 specifies as its action (or one of its set of actions) to send the packet to one of the service modules 140 for processing. In some embodiments, the service modules are functions and the actions call these functions, with the packet as a parameter to the function call. The service modules 140 of some embodiments perform middlebox functionalities, such as firewall, SNAT, DNAT, load balancing, etc., which may require the maintenance of transport connection state and also may involve the inspection and/or modification of the payload of a packet (i.e., more than the headers of a packet that define a transport connection). For instance, firewalls must maintain per-connection state to ensure that the a particular packet in a transport connection is allowed (e.g., a SYN-ACK packet will not be allowed if a SYN packet has not been previously seen in the opposite direction), and some load balancers will inspect and/or modify the http headers of a packet (which are considered part of the payload from a forwarding perspective).

In some embodiments, the set of service modules 140 operate in the user space 110 of the virtualization software on the host 100, as shown. In other embodiments, these service modules may operate in a virtual machine such as the VMs 135 and 138 (though not a VM allocated to a specific tenant of a hosting system), in separate virtual machines for each packet processing module, in namespaces or other containers that do not require separate operating systems, etc. In certain cases, when all of the entire packet processing operations operate within a single userspace process, the service modules may also run within this process in the userspace. Furthermore, in the example shown in the figure (in which the datapath is located within the kernel 105), the service modules may operate within this datapath in some embodiments.

In some embodiments, the service modules 140 are designed to perform minimal classification operations, with such operations handled by the flow entries of the MFE. When a flow entry specifies to send a packet to one of the service modules 140, the flow entry also specifies to attach an identifier to the packet that indicates the actions for the service module to take on the packet. The identifier, in some embodiments, conveys to the service module what actions to take on the packet, thus preventing the service module from needing to perform its own classification operations. In some embodiments (e.g., when the service module stores per-connection state), the identifier is connection-specific or contains both a non-connection-specific portion (e.g., specifying as much of the action for the service module to take as can be determined without knowing the state) and a connection-specific portion for use by the service module to determine the state of the connection.

The set of service modules 140 may include arbitrary modules that communicate with the MFE via a standardized interface in some embodiments. In some embodiments, an interface between the action processor 159 and the service modules 140 allows the action processor 159 to initialize the service modules and invoke the actions performed by the modules (e.g., by passing a packet object to a module, possibly along with a cache match). Each of the service modules can then access the packet object via a defined interface, allowing the service modules 140 to read and write to header fields of the packet, output the packet to a port, drop the packet, etc. In some embodiments, the service modules can also access (read from and write to) the packet payload. In addition, the service modules of some embodiments can modify the cache entries (in the exact-match cache and traffic aggregate cache), either tagging the entries or revoking entries having a given tag (e.g., in response to state changes). Furthermore, in some embodiments, the service modules can send a packet back to the beginning of the cache hierarchy after making changes to the packet and/or cache.

It should be understood that the architecture shown in FIG. 1 is an example architecture and that different embodiments can include different sets of components. The naming of the various components is arbitrary and can change from one implementation to another. Also, the architecture shows two different layers (e.g., the kernel layer and the user space layer) performing various operations. In some embodiments, these operations occur at just one layer (e.g., at the user space layer) or are further split into other layers.

II. Flow Entry Cache Hierarchy

As shown in FIG. 1, the managed forwarding element of some embodiments has a hierarchy of cached flow entries for processing packets. Specifically, some embodiments include an exact match cache of flow entries and an aggregate flow cache of partially wildcarded flow entries, along with a set of staged flow tables for full classification operations. The managed forwarding element, upon receiving a packet, first checks for a match in the exact match cache, then (if no match is found) checks the aggregate flow cache, and only performs the full classification operations using the staged flow tables if no matching flow entry is found in either of the caches. In some embodiments, the lookups for the caches (the exact-match cache and the aggregate cache) are performed in the kernel space datapath of the MFE, while the lookups over the full set of flow tables are performed in the user space.

Figure 2:
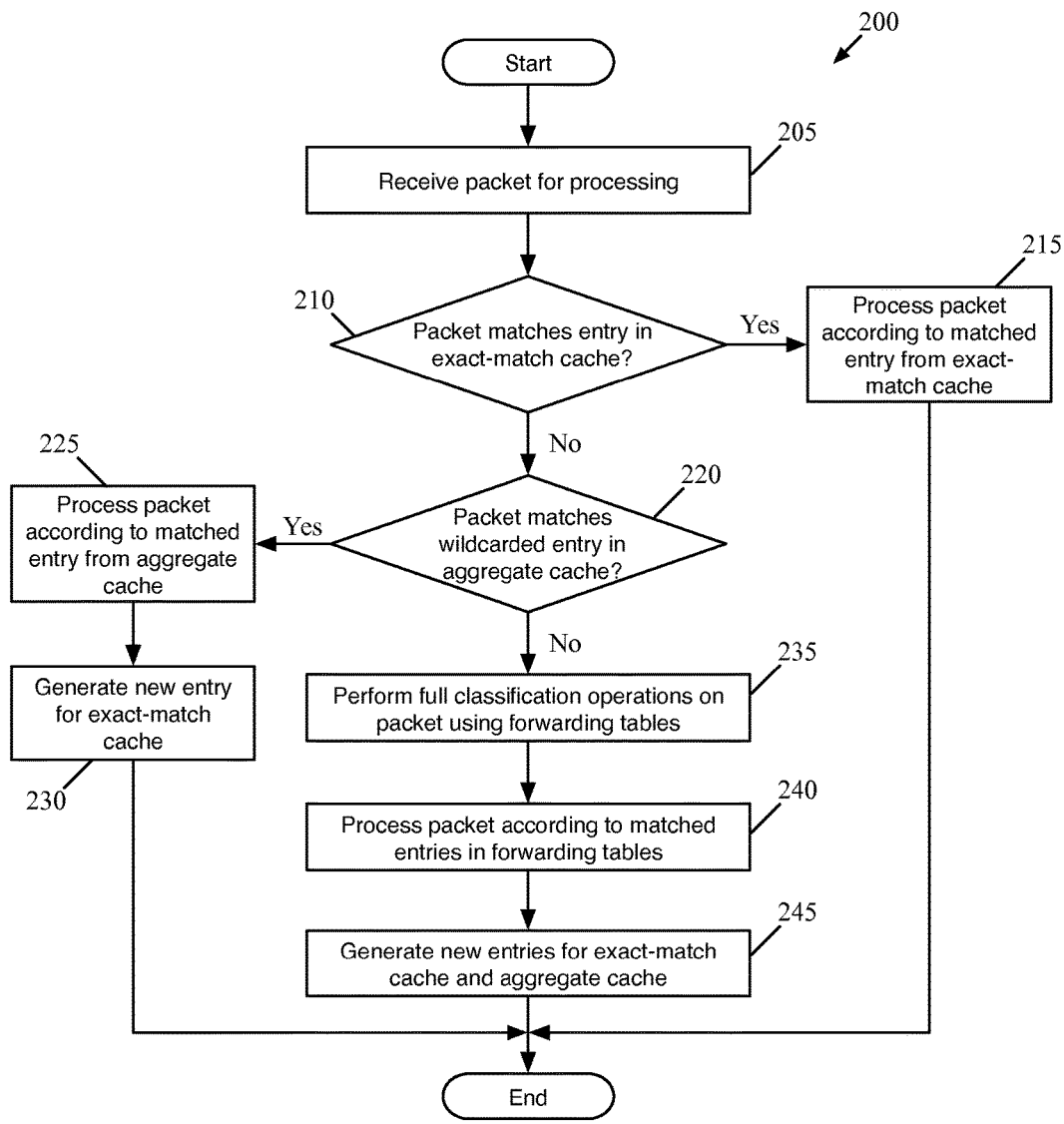
FIG. 2 conceptually illustrates a process of some embodiments for processing a packet by a MFE.

FIG. 2 conceptually illustrates a process 200 of some embodiments for processing a packet by a managed forwarding element (MFE). In some embodiments, the process 200 is performed by a MFE such as that shown in FIG. 1, described above. That is, the MFE may operate on a physical host machine and receive packets directly from and sent to virtual machines residing on that physical host. In some embodiments, the MFE has both kernel space and user space classification paths, with cached flow entries in the kernel space.

As shown, the process 200 begins by receiving (at 205) a packet for processing. The packet, in some embodiments, is received by a kernel module of the MFE, which parses the packet headers and stores these packet headers in registers (e.g., as part of a packet object). The MFE may receive the packet from an external network through a NIC of the physical host machine (e.g., for packets sent to a virtual machine residing on the host) or through a virtual port abstraction between a VM on the host and the MFE (e.g., for packets originating from a virtual machine residing on the host). The packets, in some embodiments, may also be received from a service module (e.g., a middlebox module) operating on the host machine, returning a packet to the MFE kernel after performing processing specified by the MFE.

After receiving the packet, the process 200 first determines (at 210) whether the packet matches any flow entries in the exact-match cache. In some embodiments, the exact-match cache contains a flow entry for each data flow (e.g., transport-layer connection) for which the MFE has processed a packet within a particular amount of time. Each of the flow entries in the exact-match cache matches packets based on at least a 5-tuple from the packet headers (source and destination IP addresses, source and destination transport port numbers, and transport protocol), and in some cases additional header fields or other information (e.g., ingress port, source and destination MAC addresses, etc.). A flow entry in the exact match cache specifies that if a packet matches it, to perform a set of actions (e.g., modify one or more header fields, drop the packet, output the packet to a particular port, etc.) that would be the result of processing the packet through a full set of staged flow tables.

Some embodiments use hash tables to perform the lookup in the exact match cache. For example, some embodiments generate a hash of the packet header values for each of the exact match flow entries. The MFE, upon receiving a packet, hashes the packet header values of the packet and compares them to the hashes stored in the hash table for each of the exact-match flow entries. If a match is found, then the MFE compares the actual packet headers to those of the flow entry corresponding to the matched hash. Because the hash values have fewer bits than the full set of packet header values, they are susceptible to collisions, and therefore matching a hash value does not necessitate that the packet will actually match the header values for a flow entry.

When a matching flow entry is found in the exact-match cache, the process 200 processes (at 215) the packet according to the matched flow entry. As mentioned, the cached flow entries may specify multiple actions to perform on the packet, thus providing the same end result as if the packet was processed by a full processing pipeline with several flow tables over several stages. These actions that may be applied to the packet may include modifying MAC addresses (e.g., for L3 routing operations), logically forwarding a packet to a logical egress port of a logical forwarding element, encapsulating the packet in a tunnel (the determined logical egress port may be embedded in the tunnel encapsulation header fields), sending a packet to a physical egress port, dropping a packet, etc. Because the cached flow entry is performing the actions of multiple stages of processing pipeline, numerous actions may be specified by a single cached entry. After performing the specified actions, the process 200 ends.

When no matching flow entry is found in the exact match cache, the process 200 determines (at 220) whether the packet matches any flow entries in the traffic aggregate cache. In some embodiments, the aggregate cache contains flow entries for each class of data flow that receives the same processing by the MFE. Each of the flow entries in the aggregate cache specifies values to be matched for only a subset of the total header fields of a packet. For example, if a particular class of packets results in the packet processing pipeline dropping the packet after only matching two fields (e.g., an ingress port and a source MAC address), then the aggregate cache flow entry will specify only these two fields for the match conditions and an action to drop the packet. On the other hand, for packets that are processed through the full processing pipeline and sent to an output port, the corresponding aggregation cache entry might include numerous header fields in the match conditions, and several actions to perform (e.g., headers to modify as well as the output port to which to send the packet).

As with the exact-match cache, some embodiments use hash tables to perform the lookup in the traffic aggregate cache. For example, some embodiments generate a hash of the un-wildcarded packet header values for each of the traffic aggregate flow entries. In some embodiments, as different flow entries may have different un-wildcarded header fields, the flow entries are organized into groups based on the un-wildcarded fields (i.e., all of the flow entries that match over only the ingress port, source MAC address, and destination MAC address in one group). The MFE can then generate iterate through the hash tables until a match is found, in the same manner as described for the exact-match lookup.

When a matching flow entry is found in the aggregate cache, the process 200 processes (at 225) the packet according to the matched flow entry. As mentioned, the cached flow entries may specify multiple actions to perform on the packet, thus providing the same end result as if the packet was processed by a full processing pipeline with several flow tables over several stages. These actions that may be applied to the packet may include modifying MAC addresses (e.g., for L3 routing operations), logically forwarding a packet to a logical egress port of a logical forwarding element, encapsulating the packet in a tunnel (the determined logical egress port may be embedded in the tunnel encapsulation header fields), sending a packet to a physical egress port, dropping a packet, etc. Because the cached flow entry is performing the actions of multiple stages of processing pipeline, numerous actions may be specified by a single cached entry.

The process 200 also generates (at 230) a new flow entry for the exact-match cache based on the matched traffic aggregate flow entry. Whereas the aggregate cache flow entry has some of the header fields wildcarded (i.e., a packet can have any value for those fields), the MFE un-wildcards all of the header fields for the new exact-match cache entry. Thus, only packets for the same data flow (e.g., transport connection) will match the newly-generated exact match cache entry. As a result, while the first packet in a data flow may result in a cache miss on the exact-match cache and a subsequent hit in the aggregate cache, the second and subsequent packets in the data flow should result in an exact-match cache hit.

When no matching flow entry is found in either the exact-match or aggregate cache, the process performs (at 235) the full set of classification operations on the packet using the staged forwarding tables (also referred to as flow tables). In some embodiments, this involves sending the packet to a user space module that performs lookups over numerous processing pipeline stages, resubmitting the packet after each stage until the end. These stages might include processing through several logical forwarding elements, each with several stages (e.g., ingress mapping, ingress ACL, logical forwarding, egress ACL, egress mapping). Example processing pipelines of some embodiments are described in further detail in US Patent Publication 2013/0044636, entitled "Centralized Logical L3 Routing", which is incorporated herein by reference.

The process 200 then processes (at 240) the packet according to the matched flow entries in the staged forwarding tables. In some embodiments, operations 235 and 240 are performed in stages. That is, the packet matches a flow entry at a first stage, and the actions specified by the matched flow entry are performed, including a resubmit operation. The packet then matches a flow entry at the next stage, and additional actions are performed, and so on, until a final action without a resubmit is performed on the packet (e.g., dropping the packet, sending the packet out a particular port of the MFE, etc.).

The process 200 also generates (at 245) new flow entries for the exact-match cache and the aggregate cache based on the processing by the forwarding tables. For the exact-match entry, the match conditions include all of the fields of the packet header as received by the MFE, and the actions include all of the actions that affect the packet as it is output. For instance, actions that update registers to indicate the packet processing stage do not affect the output packet and thus are not included in the cached flow entry, whereas actions that modify header values (e.g., modifying the MAC addresses as part of a L3 routing operation) are included. If a first action modifies a MAC address from a first value to a second value, and a subsequent action modifies the MAC address from the second value to a third value, some embodiments specify to modify the MAC address directly to the third value in the cached flow entry.

For the aggregate cache flow entry, the match conditions include the header fields that are matched based on the received packet, excluding matches based on modified values at later stages. For instance, with the MAC address example above, only the first MAC address value will be included as a match condition in the aggregate cache entry. Similarly, the register values that are updated to indicate subsequent processing stages are not included in the match conditions. The actions for the traffic aggregate flow entry will be the same as those for the newly generated exact-match flow entry. The generation and use of traffic aggregate cached flow entries is described in greater detail in U.S. patent application Ser. No. 14/069,284, entitled "Dynamically Generating Flows with Wildcard Fields", now issued as U.S. Pat. No. 9,602,398, and U.S. patent application Ser. No. 14/487,060, entitled "Performing a Multi-Stage Lookup to Classify Packets", now issued as U.S. Pat. No. 9,674,087, both of which are incorporated herein by reference.

While the process 200 shows the MFE generating both an aggregate cache flow entry and an exact-match cache entry from the staged forwarding tables, in some embodiments the MFE only generates an aggregate cache flow entry at this stage. The second packet for the data flow would then match the aggregate cache flow entry, from which an exact-match entry is generated. In such embodiments, the aggregate cache entries only come from the full staged forwarding table lookups, and the exact-match cache entries only come from the aggregate cache entries.

Figure 3:
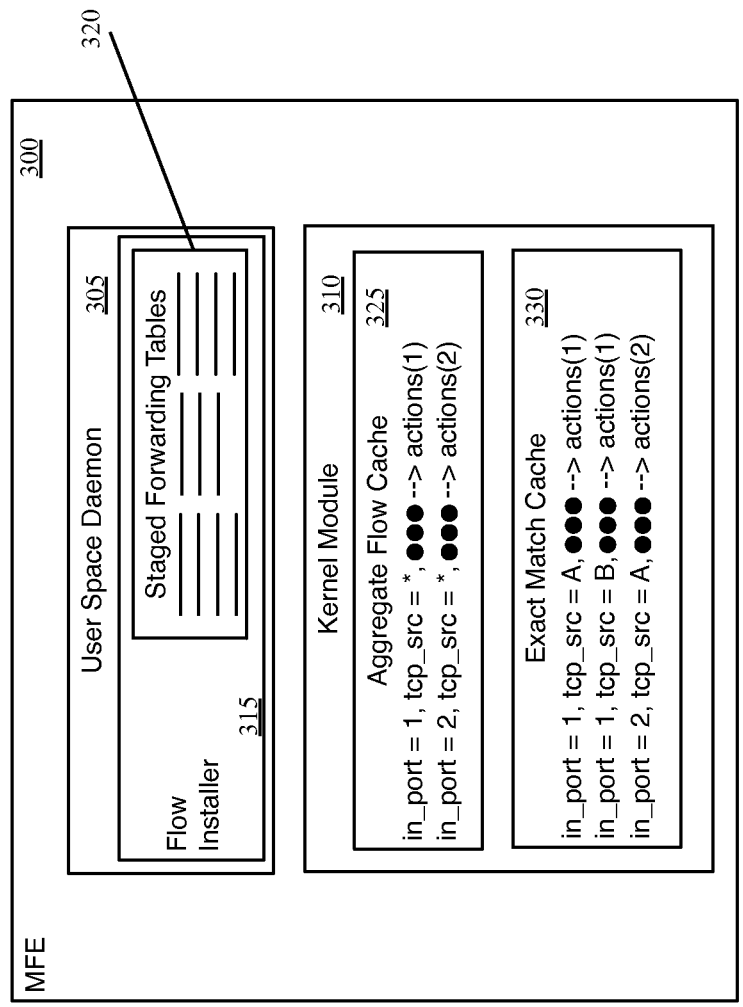
FIG. 3 conceptually illustrates a MFE with examples of aggregate cache and exact match cache flow entries.

FIG. 3 conceptually illustrates an MFE 300 with examples of aggregate cache and exact match cache flow entries. This figure shows a simplified version of the architecture of FIG. 1 for the MFE 300, illustrating that the MFE 300 includes a user space daemon 305 and a kernel module 310. The user space daemon 305 includes a flow installer 315 with staged forwarding tables 320. The user space daemon 305 uses the forwarding tables 320 to process packets that do not have a match in the aggregate flow cache or the exact match cache, as described above.

The kernel module 310 includes the aggregate flow cache 325 and the exact match cache 330. As shown, the aggregate cache 325 includes two flow entries. These flow entries match over different ingress ports, and both have the TCP source ports wildcarded. While the wildcarded field is shown, it should be understood that some embodiments do not specify this as a wildcard field, but rather simply do not include the wildcarded fields in the flow entry match conditions. Furthermore, for the sake of simplicity, only two of the possible match fields are shown for these flow entries, though it should be understood that additional match fields may be included (and that different flow entries may have different match fields (i.e., a first flow entry might omit a particular packet header field as wildcarded while a second flow entry specifies a particular value for that particular packet header field). In addition, these two flow entries result in different actions.

The exact match cache 330 includes three flow entries. The first two are species of the first aggregate cache flow entry, in that they match packets with an ingress port of 1 and different TCP source ports. Both of the flow entries result in action 1, the same as the first aggregate cache entry. The third exact match flow entry specifies that a packet with ingress port 2 and TCP source A will be processed with action 2, as this is a species of the second aggregate cache entry. Thus, despite the first and third exact match flow entries specifying the same TCP source port, these do not result in the same processing because the ingress ports are different.

Figure 4:
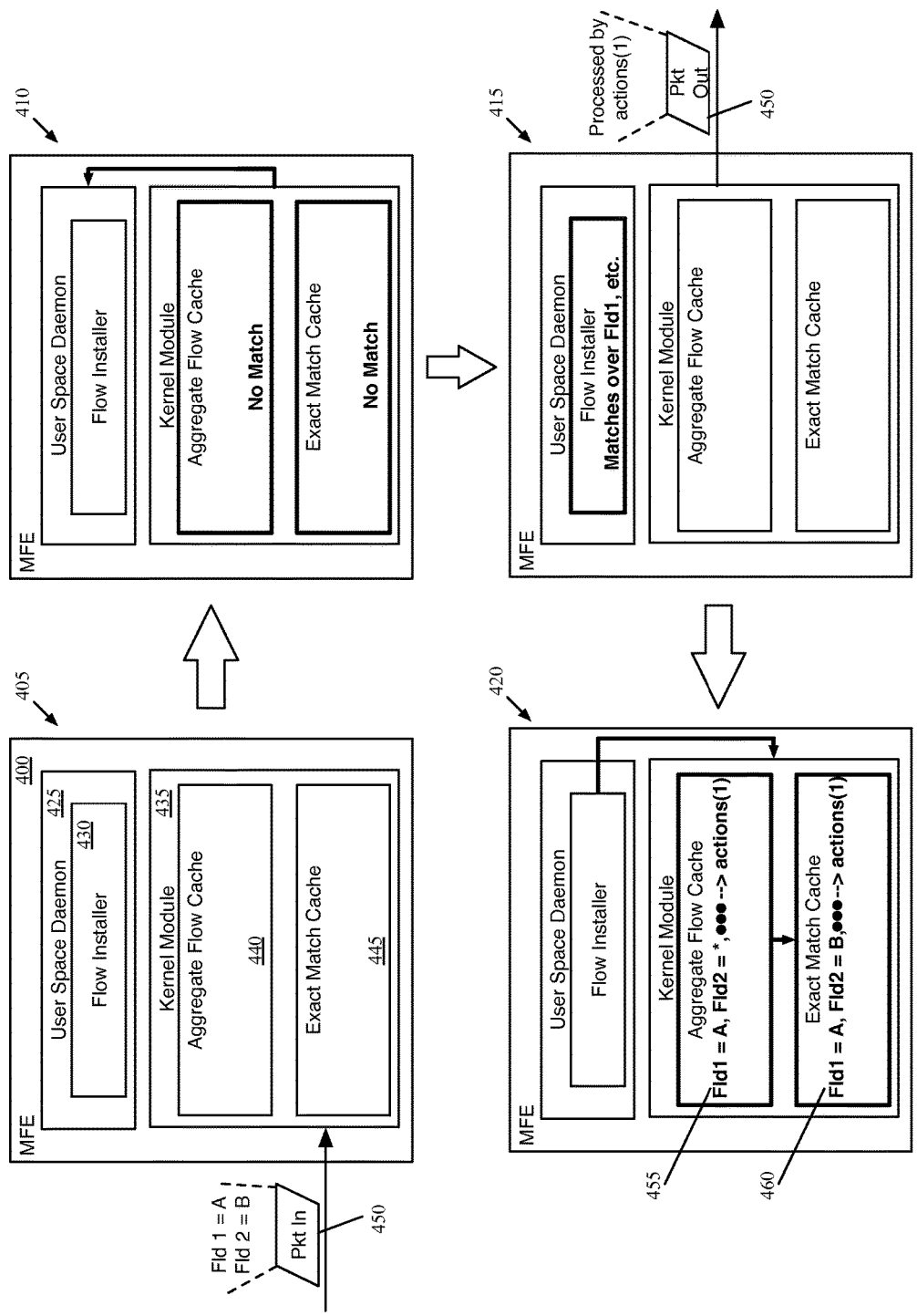
FIG. 4 illustrates the processing of a first packet by the flow installer.

FIGS. 4-7 conceptually illustrate the processing of several packets by an MFE 400 of some embodiments. Specifically, these examples illustrate the building up and use of cached flow entries by the MFE 400 over the course of the several packets. FIG. 4 illustrates the processing of a first packet by the flow installer over four stages 405-420. The MFE 400 includes a user space daemon 425 with a flow installer 430, and a kernel module 435 with an aggregate flow cache 440 and an exact-match cache 445. In some embodiments, these components operate in the same or similar manner to the corresponding components of the MFEs of FIG. 3 and FIG. 1.

The first stage 405 of FIG. 4 illustrates the MFE 400 receiving a packet 450. This packet has a value of A for a first header field and a value of B for a second header field, among its numerous header fields. The packet may be received from a VM or other data compute node operating on the same host machine as the MFE or from an external machine through a NIC of the host machine.

This specification often refers to packets and packet headers, as with the packet 450. The term "packet" is used here as well as throughout this application to refer to a collection of bits in a particular format sent across a network. It should be understood that the term packet may be used herein to refer to various formatted collections of bits that may be sent across a network, such as Ethernet frames, TCP segments, UDP datagrams, IP packets, etc.

As shown at the second stage 410, the MFE first checks the caches in the kernel to find a matching flow entry for the packet. As these caches are empty (e.g., because the host machine on which the MFE operates has just recently been powered on), no matches are found in either cache. The kernel module 435 first performs a lookup in the exact match cache 445, then when no match is found performs a lookup in the aggregate flow cache 440. In some embodiments, were there flow entries in the caches, a hash lookup would be used, as described above by reference to FIG. 2. With no matches in either of the kernel space caches, the packet is sent to the user space daemon The third stage 415 illustrates that the user space daemon 425 performs a series of lookups over staged forwarding tables, which include matches over Field 1 of the packet header, as well as other fields. The lookups in the forwarding tables result in a particular set of actions (denoted as actions(1)) that are applied to the packet, including sending the packet 450 out of the MFE through a particular port.

In the fourth stage, the flow installer installs new flow entries 455 and 460 into the aggregate flow cache 440 and the exact-match cache 445, respectively. As shown, the exact-match flow entry 460 specifies a match over each field of the packet, including both Field 1 (a value of A) and Field 2 (a value of B). On the other hand, the aggregate flow entry 455 only specifies matches over the fields that affected the outcome for the packet as processed by the flow installer, and thus include a match over Field 1 (a value of A) with Field 2 wildcarded. Both of the flow entries 455 and 460 specify to perform actions(1) if matched.

As indicated above, in some embodiments the MFE only generates an aggregate cache flow entry at this stage. That is, the flow installer would install only the new flow entry 455 in the aggregate flow cache. A subsequent packet having a Field 1 value of A and a Field 2 value of B would result in the generation of the exact-match flow entry 460 based on the matched aggregate flow entry 455.

Figure 5:
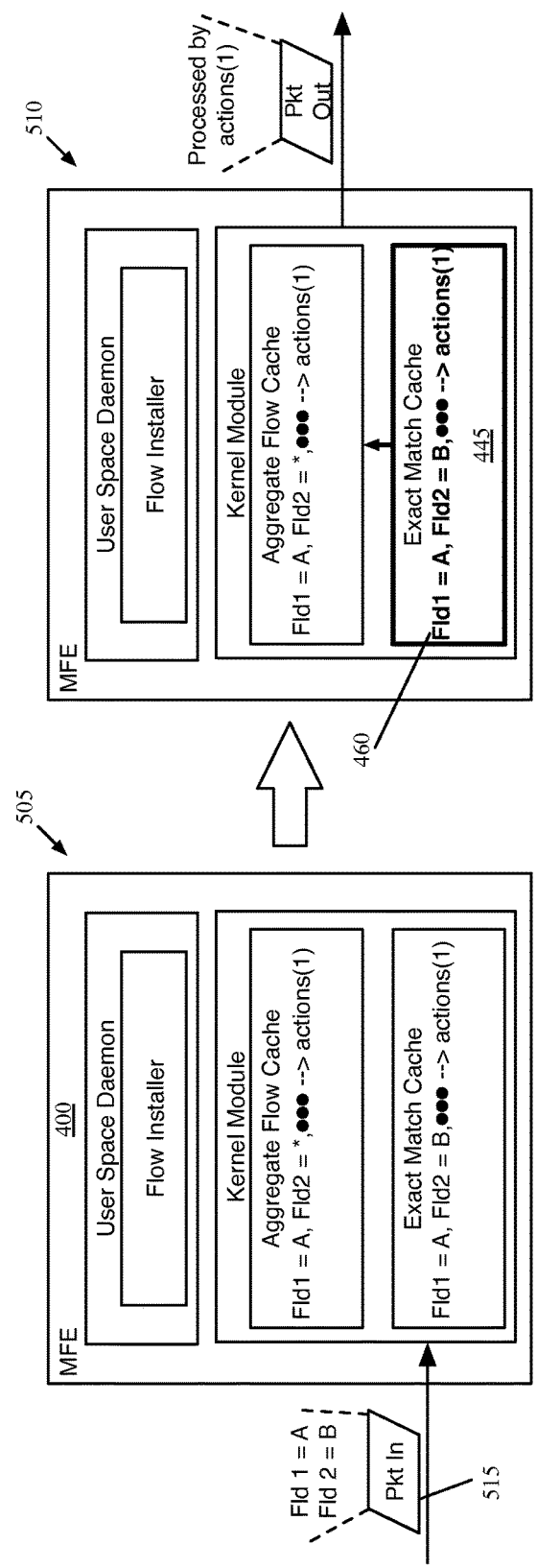
FIG. 5 conceptually illustrates the processing of a second packet having the same characteristics as the first packet.

FIG. 5 conceptually illustrates the processing of a second packet 515 having the same characteristics as the first packet 450 by the MFE 400, over two stages 505-510. In the first stage 505, the MFE 400 receives the packet 515, which has a value of A for header Field 1 and a value of B for header Field 2. In this figure, the packet 515 is also received from the same ingress port as the first packet 450 (as different ingress ports would typically lead to different processing for two packets). In some embodiments, the ingress port is treated as a packet header field which may be used to match flow entries.

In the second stage 510, the kernel module 435 initially performs a lookup in the exact match cache 445 (e.g., by hashing the header fields of the packet 515 and attempting to find a match in a hash table for the exact match cache). In this case, the packet 515 matches the cached exact-match flow entry 460. The packet 515 is from the same data flow as the first packet 450, as all subsequent packets for the data flow (at least in the same direction) will match the exact match flow entry. Reverse direction packets will generally cause the creation of a second exact match flow entry with different actions specified. With the match found, the MFE performs the actions(1) specified by the matched flow entry and outputs the packet 515 through the same port as for the previous packet 450. In this case, because an exact match entry was found, the aggregate cache and staged forwarding tables were not consulted, and no new flow entries were generated.

Figure 6:
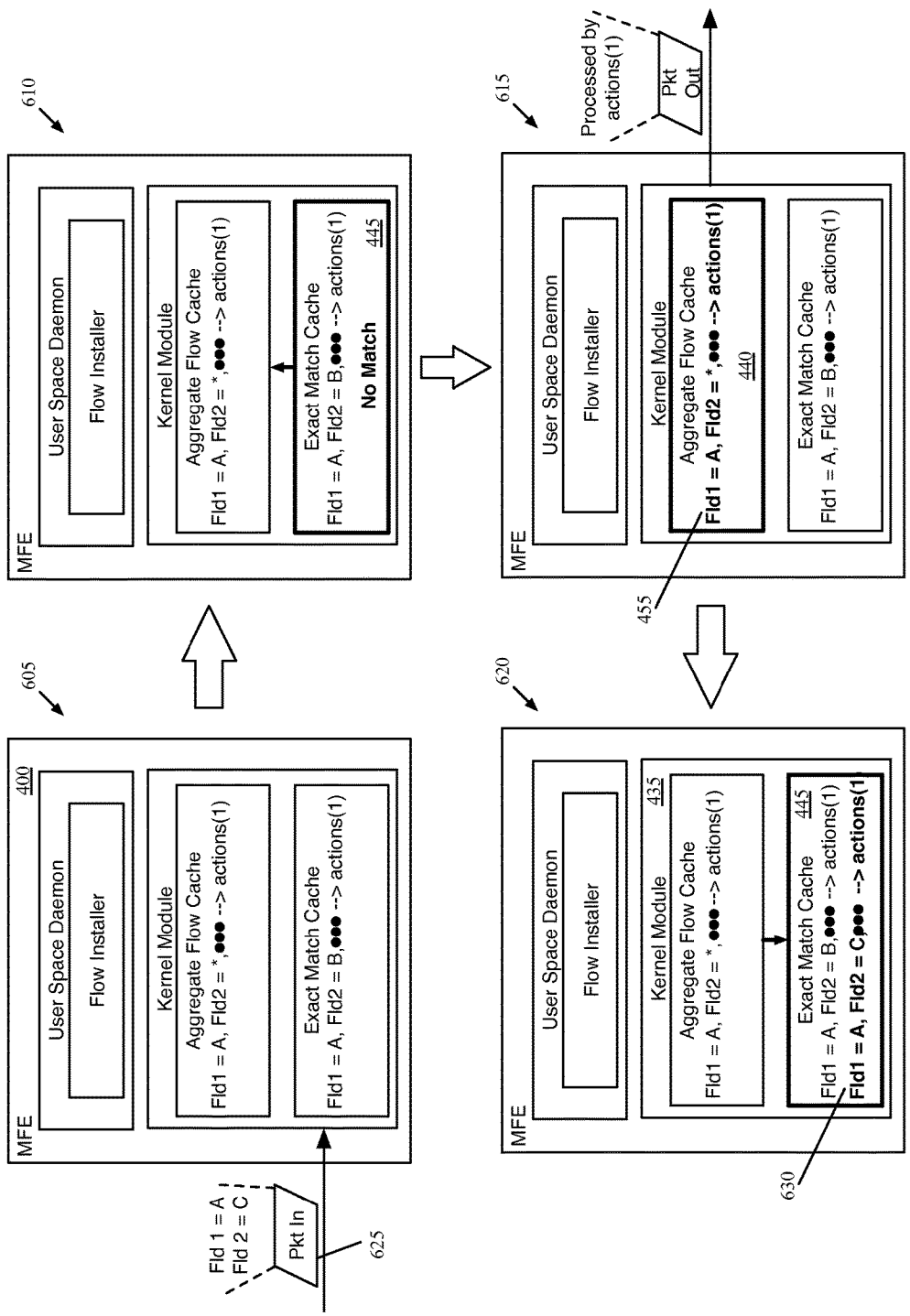
FIG. 6 conceptually illustrates the processing of a third packet that falls into the same traffic aggregate class as the first packet but is from a different data flow.

FIG. 6 conceptually illustrates the processing of a third packet 625 that falls into the same traffic aggregate class as the packet 450 but is from a different data flow, over four stages of the MFE 400. As shown, the first stage 605 illustrates the MFE 400 receiving the third packet 625. This packet has a value of A for the header Field 1 and a value of C for the second header Field 2, and is received via the same ingress port as the first two packets 450 and 515.

The second stage 510 illustrates that the MFE first checks the exact match cache 445 and does not find a matching flow entry (because the Field 2 value for the current packet 625) differs from that specified by the flow entry 460. In the third stage 515, however, the MFE then performs a lookup in the aggregate flow cache 440 (e.g., using a hash of the un-wildcarded packet header fields). In this case, the packet 625 matches the cached aggregate flow entry 455. The packet 625 might be sent from the same VM on the host machine to the same destination address as the first two packets (but for a different transport-layer connection), or could be sent from different addresses to the same destination VM on the host, as examples of data flows that would receive the same processing. With the matching flow entry 455 found, the MFE performs the actions(1) specified by the matched flow entry and outputs the packet 625 through the same port as for the previous packets 450 and 515.

As shown in the fourth stage 620, the kernel module 435 also installs a new flow entry 630 in the exact match cache 445 for the new data flow. The new flow entry 630 specifies the same set of actions(1) as the other cached flow entries, but based on a match over each field of the packet 625, including both Field 1 (a value of A) and Field 2 (a value of C).

Figure 7:
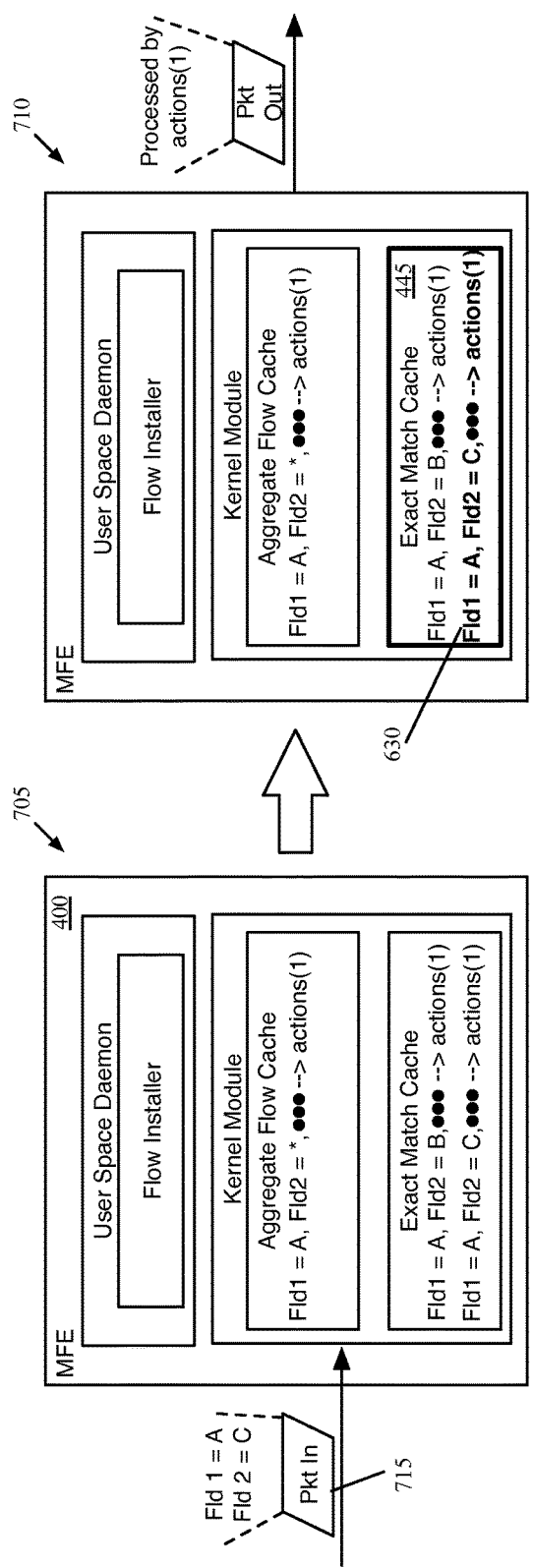
FIG. 7 conceptually illustrates the processing by the MFE of a third packet having the same characteristics as the third packet.

FIG. 7 conceptually illustrates the processing by the MFE 400 of a third packet 715 having the same characteristics as the third packet 625, over two stages 705-710. In the first stage 705, the MFE 400 receives the packet 710, which has a value of A for header Field 1 and a value of C for header Field 2. This packet is received from the same ingress port as the previous three packets.

In the second stage 710, the kernel module initially performs a lookup in the exact match cache 445 (e.g., by hashing the header fields of the packet 715 and attempting to find a match in a hash table for the exact match cache). In this case, the packet 715 matches the cached exact-match flow entry 630. The packet 715 is from the same data flow as the third packet 625, as all subsequent packets for the data flow (at least in the same direction) will match the flow entry 630. With the match found, the MFE 400 performs the actions(1 by the matched flow entry and outputs the packet 715 through the same port as for the previous packet 630. Because in this case an exact match flow entry was found, the aggregate cache and staged forwarding tables were not consulted, and no new flow entries were generated.

For a typical MFE in a virtualized network environment, initially after powering on, the staged forwarding tables will be used extensively, resulting in longer processing times and more computations for packet processing. However, the caches will quickly begin to fill up, such that very few packets will require the full set of classification lookups in the user space after a time. As new VMs (or other data compute node endpoints) are created, new data flows will require the full classification processing, but most packets will still be processed with the cached flow entries. Furthermore, only the first packet of each of these new data flows that do not match a traffic aggregate class will require the full classification, with subsequent packets processed by the exact match cache.

III. Caching of Classification Decisions for Services

The above section describes the caching of classification decisions for packets on which any action may be performed. Some such packets will be sent to middlebox-type services (e.g., SNAT (or SNATP), load balancer, DNAT, firewall, etc.). These services typically include their own classification operations to determine what service operations to execute on a particular packet, as well as the actual packet transformations (which often use per-connection state determined from the classification). These services, in some embodiments, operate on the same physical machine as the MFE (in fact, in some embodiments, they operate as modules that are part of the MFE), and therefore are subject to the same computation efficiency constraints as the standard L2 and L3 packet processing. As such, some embodiments move as much as possible of the service-level classification into the packet processor (e.g., the MFE packet processing described above), using similar caching techniques, such that the service only needs to perform the packet transformations.

Figure 8:
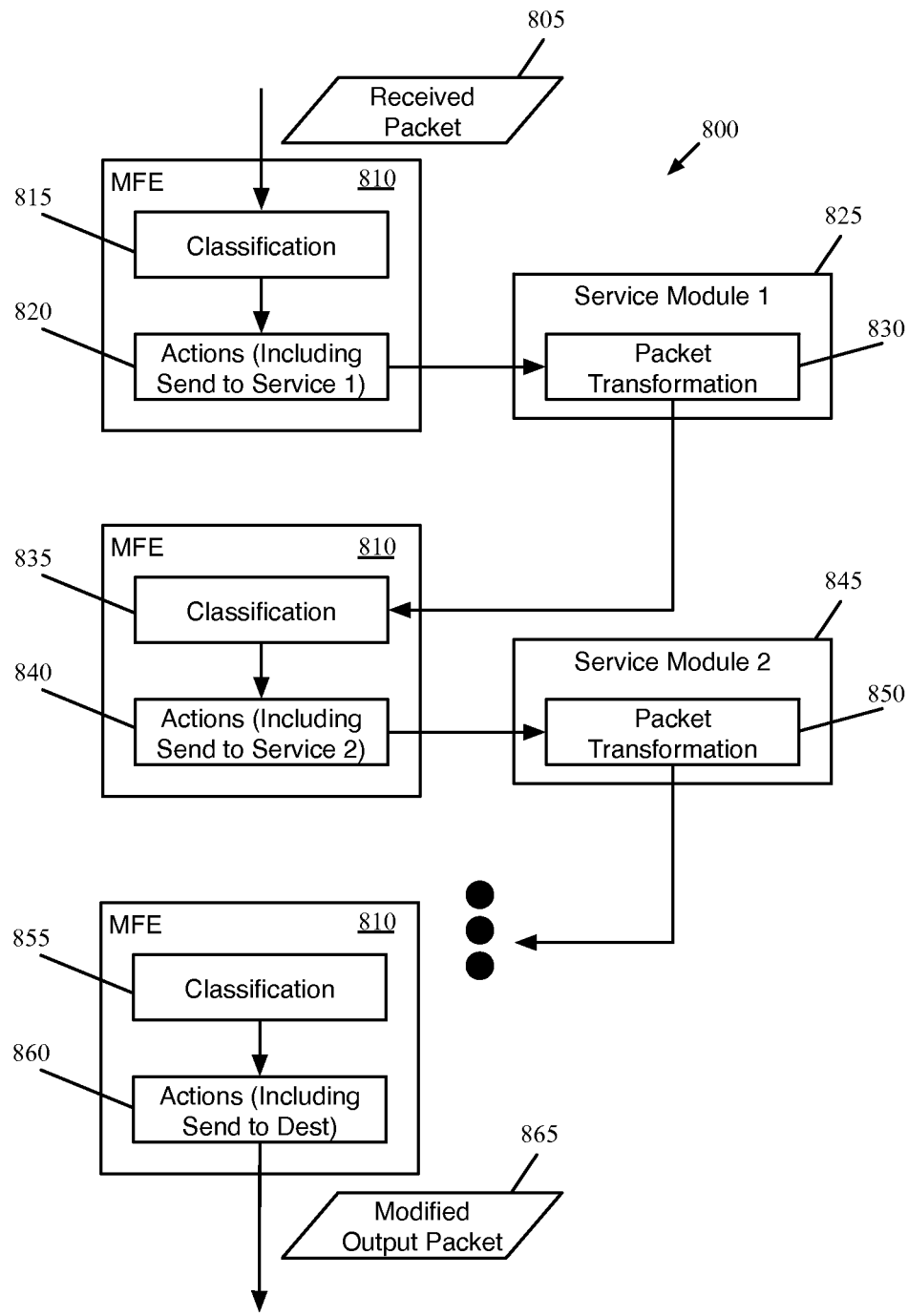
FIG. 8 conceptually illustrates a generic pipeline of operations performed by a MFE and service modules operating on the host machine with the MFE.

FIG. 8 conceptually illustrates a generic pipeline of operations 800 performed by a MFE 810 and service modules operating on the host machine with the MFE for a packet 805 that is processed by several services. As shown, the packet is received by the MFE 810 (e.g., by the kernel module of the MFE). The MFE 805 initially performs a first set of classification operations 815 to identify a set of actions to perform on the packet. The classification operations may involve, in some embodiments, identifying an exact match flow entry for the packet, an aggregate flow entry if no exact-match entry is found, or performing a full set of classification operations. As described below, the cache hierarchy may be applied to flow entries that specify to forward packets to service modules.

The MFE 810 then performs the set of actions 820 specified by the classification operations, which includes an action to send the packet to a first service module 825. In some embodiments, the packet is sent to the service module 825 along with an out-of-band information (e.g., a flat label) that indicates the packet transformations for the first service module 825 to perform on the packet. As such, the service module 825 performs the indicated packet transformations 830 without performing its own classification operations. To the extent that per-connection state is required by the service module 825, the out-of-band information contains a connection identifier known to the service module 825 for all but the first packet of a connection. These packet transformations may involve modifying packet headers (e.g., for SNAT or DNAT), stateful operations that do not actually modify the packet (e.g., firewall operations to block or accept packets based on connection state), or even operations that modify the payload of the packet (e.g., application-level operations).

The first service module 825 then returns the packet to the MFE 810, which performs an additional classification stage (or set of stages) 835, which identify another set of actions to perform on the packet. The MFE 810 then performs this new set of actions 840, which includes an action to send the packet to a second service module 845. As with the previous service module, some embodiments send the packet to the second service module 845 along with out-of-band information that indicates the packet transformations for the second service module 845 to perform on the packet. As such, the second service module 845 performs the indicated packet transformations 850 without the need to perform its own classification operations. To the extent that per-connection state is required by the service module 845, the out-of-band information contains a connection identifier known to the service module 845 for all but the first packet of a connection.

Depending on the size of the logical topology of the logical network to which the packet belongs and the number of services that process the packet, the packet may be sent between the MFE and several additional service modules. This figure, and subsequent examples, assume that the service modules are operating in the host machine (e.g., as user space daemons, in separate VMs or other data compute nodes (e.g., namespaces), etc.). This (i) makes the elimination of classification operations more important and (ii)

enables the MFE to embed any information needed for the packet (e.g., the out-of-band information that specifies the actions for the service module to take). The MFE of some embodiments defines an object for the packet and passes control of the object to the service module, with the out-of-band information as data stored by the packet object. As such, the out-of-band information does not need to fit into a particular location in a packet constructed to be sent over a physical wire to another machine. Services located off of the host machine may need to perform their own classification operations, but doing so will not affect the computational resources available to the MFE for packet processing.

Eventually, the MFE 810 performs a classification stage 855 that specifies a set of actions that send the packet to its next physical destination (either a VM on the host machine or over the physical network to another machine). Thus, the MFE 810 performs the specified set of actions 860, and forwards the modified packet 865 to its next hop.

In some cases, when all of the service modules perform operations that do not modify the packet headers, a single cache entry may be generated for the packet that specifies each of the services to receive the packet in order and which can be executed without subsequent cache lookups after each service module. Thus, all of the classification operations can be performed before any service transformations, saving additional computation resources. However, when the service modules modify the packet headers (especially if the headers are modified in a non-deterministic manner within a connection), classification stages may be required after each service module packet transformation (or at least after some of them).

Some embodiments, as mentioned, use the exact-match cache and aggregate cache flow entries to cache service classification decisions as well as the actions for the MFE to perform. For example, if an exact-match flow entry specifies to send the packet to a network service (firewall, SNAT, load balancer, etc.) among other actions, some embodiments also include in the exact match flow entry both the connection state for the network service and an indicator of the payload transformations or other service actions for the network service to execute on the packet. If no exact-match flow entry is found, but the packet instead matches an aggregate cache flow entry, the matching flow entry will specify to send the packet to the network service along with an indicator of the payload transformations to execute, but will not have connection state information for the packet. When a packet results in cache misses for both the exact-match and the aggregation flow caches, the MFE performs the full classification operations, which specify to send the packet to the network service along with the payload transformation indicator, but will again not have the connection state for the packet.

Figure 9:
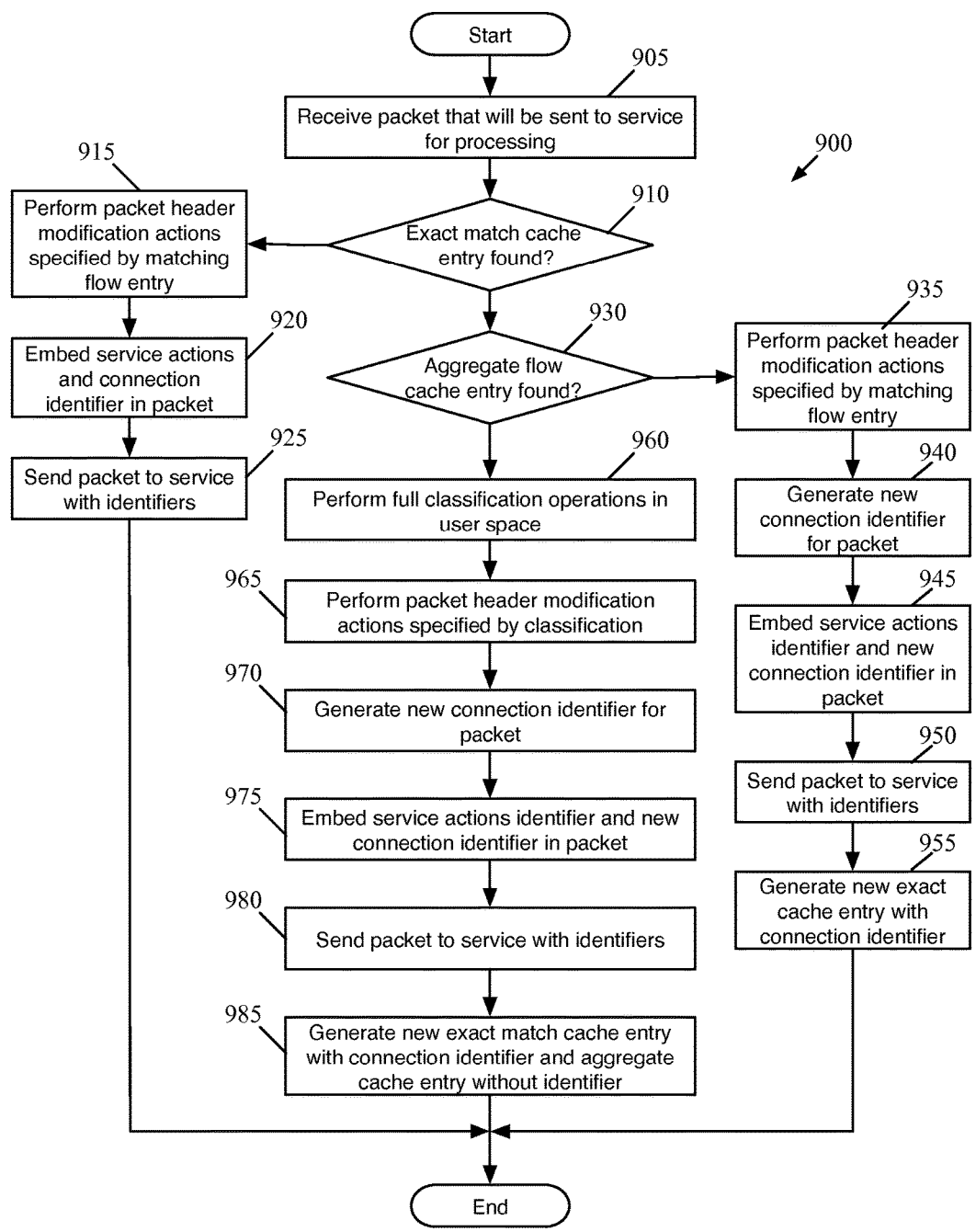
FIG. 9 conceptually illustrates a process of some embodiments for processing a packet to send the packet to a network service.

FIG. 9 conceptually illustrates a process 900 of some embodiments for processing a packet to send the packet to a network service. In some embodiments, the process is performed by a software managed forwarding element that operates on a host machine, and the network service operates on the same host machine (e.g., as part of the MFE or in conjunction with the MFE). As shown, the process 900 begins by receiving (at 905) a packet that will be sent to a network service for processing. It should be understood that the MFE, upon receiving the packet, does not differentiate between packets that will eventually be sent to a network service and packets for other destinations. This determination is only made upon finding a matching flow entry that specifies to send the packet to the network service. However, for the sake of simplicity, this process 900 only describes the operations for such packets. The processing for other packets would follow the same cache hierarchy, but the MFE would not need to perform operations relating to the service action or connection identifiers. In fact, FIG. 2 above describes the processing for all packets in some embodiments, including packets sent to a service.

After receiving the packet, the process 900 determines (at 910) whether the packet matches any flow entries in the exact-match cache. In some embodiments, the exact-match cache contains a flow entry for each data flow (e.g., transport-layer connection) for which the MFE has processed a packet within a particular amount of time. Each of the flow entries in the exact-match cache matches packets based on at least a 5-tuple from the packet headers (source and destination IP addresses, source and destination transport port numbers, and transport protocol), and in some cases additional header fields or other information (e.g., ingress port, source and destination MAC addresses, etc.). A flow entry in the exact match cache specifies that if a packet matches it, to perform a set of actions (e.g., modify one or more header fields, drop the packet, output the packet to a particular port, etc.) that would be the result of processing the packet through a full set of staged flow tables.

In this case, the actions specify to send the packet to a network service module, in addition to (possibly) other actions (e.g., modification of MAC addresses associated with routing, etc.). As such, if a matching flow entry is found in the exact-match cache, the process performs (at 915) the packet header modification actions specified by this matching flow entry. In most cases, if any such actions are specified, these actions will involve changing the source and destination MAC addresses based on the packet having been routed to the network service module. In general, because the packet is being sent to a network service module (i.e., delivered to a destination) and not sent through a tunnel to another MFE that implements logical network processing, no logical context identifiers will be attached to the packet at this time. In some cases, no actions are specified other than sending the packet to the network service.

The process 900 also embeds (at 920) out-of-band information in the packet, including a service actions identifier and a connection state identifier. In some embodiments, the service action identifier is an identifier that instructs the network service what actions (e.g., what payload transformations) to perform on the packet, and is specified by the aggregate cache and full classification flow entries as well. The connection state identifier, in some embodiments, is only specified by the exact-match cache, as the other layers of the flow entry hierarchy may be matched by multiple different connections. The connection state identifier may simply be an integer (or other type of value) that uniquely identifies the connection (so long as there enough bits in the identifier to easily accommodate the number of connections that will be simultaneously open and sending packets through the MFE, the identifiers can be re-used as connections terminate). In some embodiments, either the matched flow entry that creates the exact-match entry (either an entry in a stage of the forwarding tables or an aggregate cache entry) generates the connection identifier, or the service itself generates the identifier and provides this information for the MFE to insert into the flow entry. In that case, the identifier may provide additional information beyond just identifying the connection. For example, a SNATP service module might assign source IP and port number for a connection, and save this information to the exact-match flow entry stored by the MFE in some embodiments (though in other embodiments, it simply saves this to its per-connection state associated with a connection identifier, and updates the exact-match flow entry to include the connection identifier).

The process then sends (at 925) the packet (with the embedded identifiers) to the network service. At this point, the network service can use the embedded identifiers to determine how to process the packet. Because the packet is the second or later packet in a connection, the network service module will have stored state for the connection (if the service performs stateful operations), which is accessed based on the connection identifier. The service can perform its operations (SNAT, load balancing, payload encryption, firewall, etc.) and return the packet to the MFE for any further processing. At this point, the process 900 ends (although the packet processing is not complete, this stage of classification is finished).

If, at 910, no matching flow entry is found in the exact match cache, the process 900 determines (at 930) whether the packet matches any flow entries in the traffic aggregate cache. In some embodiments, the aggregate cache contains flow entries for each class of data flow that receives the same processing by the MFE. For packets that are sent to a network service, this works in the same manner, in that the traffic aggregate specifies the same operation for the service as does the user space forwarding table entry. If the entire classification can be pulled out of the service module, then the specific actions for the service to perform are indicated in the aggregate cache flow entry. However, if the service performs operations in a non-deterministic manner (i.e., if the same connection might be processed differently based on when it is received, or based on the payload), then some level of classification will be need to be performed by the network service.

For both the exact-match lookup and the traffic aggregate lookup, the MFE of some embodiments uses hash tables to perform the lookups in the exact match cache, as described above by reference to FIG. 2. However, such hash lookups are not necessary, and other embodiments use lookups that search for a match based on the entire packet header values (although the hash table lookups are an optimization to save computational resources).

If a matching flow entry is found in the traffic aggregate cache, the process performs (at 935) the packet header modification actions specified by this matching flow entry. In most cases, if any such actions are specified, these actions will involve changing the source and destination MAC addresses based on the packet having been routed to the network service module. In general, because the packet is being sent to a network service module (i.e., delivered to a destination) and not sent through a tunnel to another MFE that implements logical network processing, no logical context identifiers will be attached to the packet at this time. In some cases, no actions are specified other than sending the packet to the network service.

The process then generates (at 940) a new connection identifier for the packet (and for the subsequent packets in the connection). Packets processed by the traffic aggregate cache (or the full set of staged forwarding tables) will typically be the first packet in a connection, and thus part of generating a useful exact-match cache entry for sending the packet to a network service entails ensuring that the exact-match flow entry includes an identifier that notifies the network service that the packet is part of an established connection. In the process 900, this connection identifier is generated by the MFE as part of the actions specified by the flow entry.

The process 900 also embeds (at 945) out-of-band information in the packet, including a service actions identifier and the new connection state identifier. In some embodiments, the service action identifier is an identifier that instructs the network service what actions (e.g., what payload transformations) to perform on the packet. The connection state identifier may simply be an integer (or other type of value) that uniquely identifies the connection in some embodiments, as described above.

The process then sends (at 950) the packet (with the embedded identifiers) to the network service. At this point, the network service can use the embedded identifiers to determine how to process the packet. Because the packet is the first packet in its connection, the network service module will not have any stored state for the connection (only an issue if the service performs stateful operations). For non-stateful services, the service uses the service actions identifier to determine its operation according to its configuration, and can perform its operations (SNAT, load balancing, payload encryption, firewall, etc.) and return the packet to the MFE for any further processing. For services that perform stateful operations, the network service module also establishes connection state for the new connection, which it uses to process subsequent packets for the connection (based on the connection identifier embedded in the packet at 920).

The process also generates (at 955) a new flow entry for the exact-match cache based on the matched traffic aggregate flow entry. Whereas the aggregate cache flow entry has some of the header fields wildcarded (i.e., a packet can have any value for those fields), the MFE un-wildcards all of the header fields for the new exact-match cache entry. Thus, only packets for the same connection will match the newly-generated exact match cache entry. This exact-match cache entry will include the connection identifier generated at 940 for the new connection. At this point, the process 900 ends (although the packet processing is not complete, this stage of classification is finished).

As shown in this process, in some embodiments the connection identifier is generated by the MFE according to instructions stored in the flow entry. In other embodiments, however, the first packet of a connection is sent to the network service without an identifier, and the network service module generates this identifier (which may contain per-connection state data such as IP address and/or port number for SNAT) as part of its packet processing and transformation. The network service module then stores the identifier in the exact-match flow entry.

When no matching flow entry is found in either the exact-match cache or aggregate cache, the process performs (at 960) the full set of classification operations on the packet using the staged forwarding tables. In some embodiments, this involves sending the packet to a user space module that performs lookups over numerous processing pipeline stages, resubmitting the packet after each stage until the end. These stages might include processing through several logical forwarding elements, each with several stages (e.g., ingress mapping, ingress ACL, logical forwarding, egress ACL, egress mapping). Example processing pipelines of some embodiments are described in further detail in US Patent Publication 2013/0044636, which is incorporated by reference above. In this case, the final stage specifies as its action (or as one of its actions) to send the packet to the network service.

The process then performs (at 965) the packet header modifications specified by the matching flow entries in the forwarding table. In some embodiments, the operations 960 and 965 are performed in stages. That is, the packet matches a flow entry at a first stage, and the actions specified by the matched flow entry are performed, including a resubmit operation. The packet then matches a flow entry at the next stage, and additional actions are performed, and so on, until a final set of actions without a resubmit is performed on the packet (e.g., sending the packet to the network service).

The process then generates (at 970) a new connection identifier for the packet (and for the subsequent packets in the connection). Packets processed by the full set of staged forwarding tables will typically be the first packet in a connection, and thus part of generating a useful exact-match cache entry for sending the packet to a network service entails ensuring that the exact-match flow entry includes an identifier that notifies the network service that the packet is part of an established connection. In the process 900, this connection identifier is generated by the MFE as part of the actions specified by the flow entry (as described above with respect to the aggregate cache, in some embodiments the connection identifier is generated by the service module and inserted into the exact-match cache entry.

The process 900 also embeds (at 975) the out-of-band information in the packet, including a service actions identifier and the new connection state identifier. In some embodiments, the service action identifier is an identifier that instructs the network service what actions (e.g., what payload transformations) to perform on the packet. The connection state identifier may simply be an integer (or other type of value) that uniquely identifies the connection in some embodiments, as described above.

The process then sends (at 980) the packet (with the embedded identifiers) to the network service. At this point, the network service can use the embedded identifiers to determine how to process the packet. Because the packet is the first packet in its connection, the network service module will not have any stored state for the connection (only an issue if the service performs stateful operations). For non-stateful services, the service uses the service actions identifier to determine its operation according to its configuration, and can perform its operations (SNAT, load balancing, payload encryption, firewall, etc.) and return the packet to the MFE for any further processing. For services that perform stateful operations, the network service module also establishes connection state for the new connection, which it uses to process subsequent packets for the connection (based on the connection identifier embedded in the packet at 920).

The process also generates (at 985) new flow entries for the exact-match cache and the traffic aggregate cache based on the processing by the forwarding tables. For the exact-match entry, the match conditions include all of the fields of the packet header as received by the MFE, and the actions include all of the actions that affect the packet as it is output (as described above by reference to FIG. 2). For the aggregate cache flow entry, the match conditions include the header fields that are matched based on the received packet, excluding matches based on modified values at later stages. The actions for the traffic aggregate flow entry will be the same as those for the newly-generated exact-match flow entry, with the exception of the specification of a connection identifier for use by the service module to which the flow entries send matching packets. The aggregate cache flow entry will not include a connection identifier (instead, in some embodiments, specifying instructions to generate a connection identifier), whereas the exact-match cache entry includes the connection identifier generated at 970 for the new connection. At this point, the process 900 ends (although the packet processing is not complete, this stage of classification is finished).

As with the process 200 above, while the process 900 shows the MFE generating both an aggregate cache flow entry and an exact-match cache entry from the staged forwarding tables, in some embodiments the MFE only generates an aggregate cache flow entry at this stage. The second packet for the data flow would then match the aggregate cache flow entry, from which an exact-match entry is generated. In such embodiments, the aggregate cache entries only come from the full staged forwarding table lookups, and the exact-match cache entries only come from the aggregate cache entries.

Figure 10A:
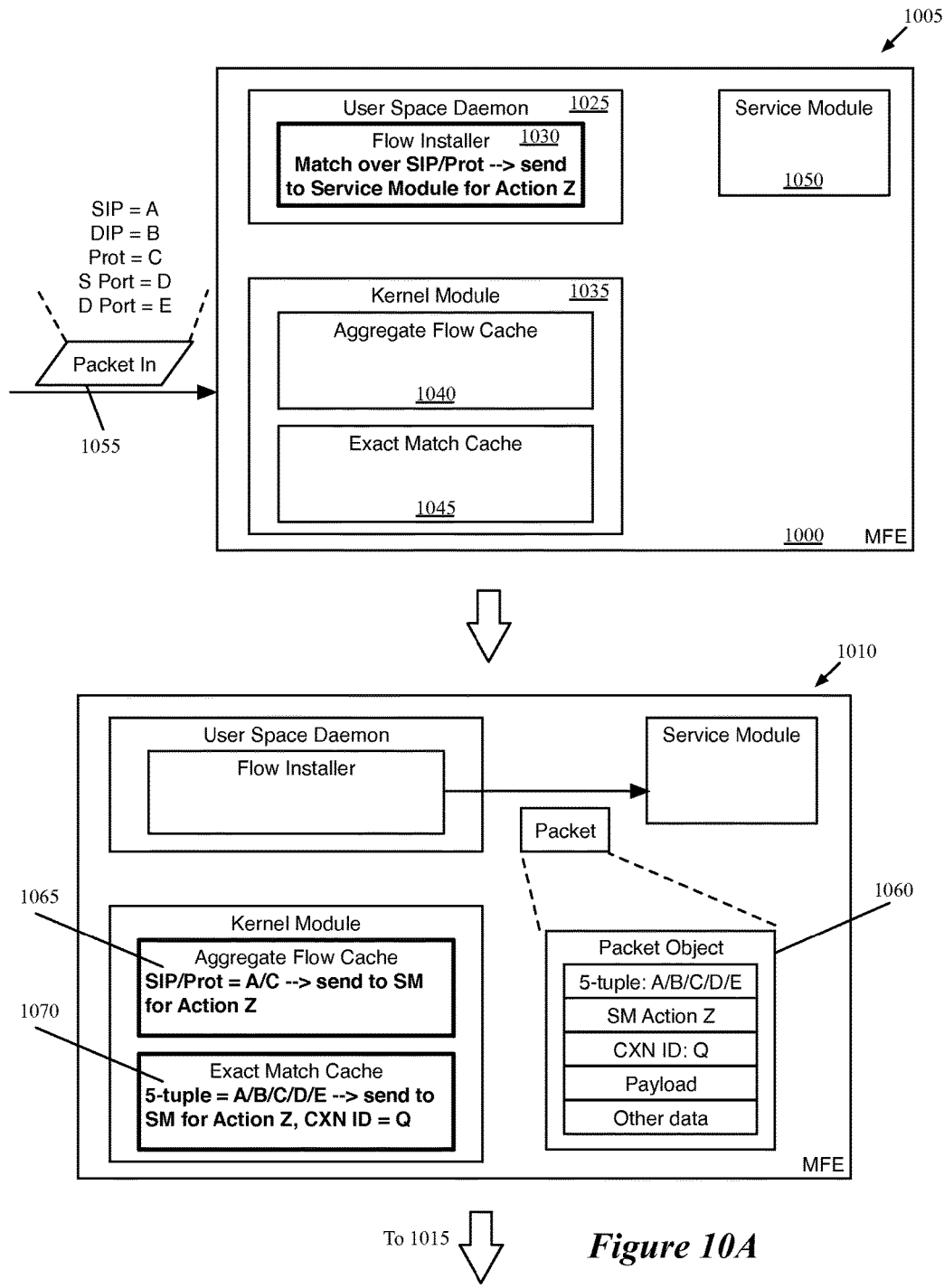
FIGS. 10A-B illustrate the processing of a first packet by a MFE and service module of some embodiments.
Figure 10B:
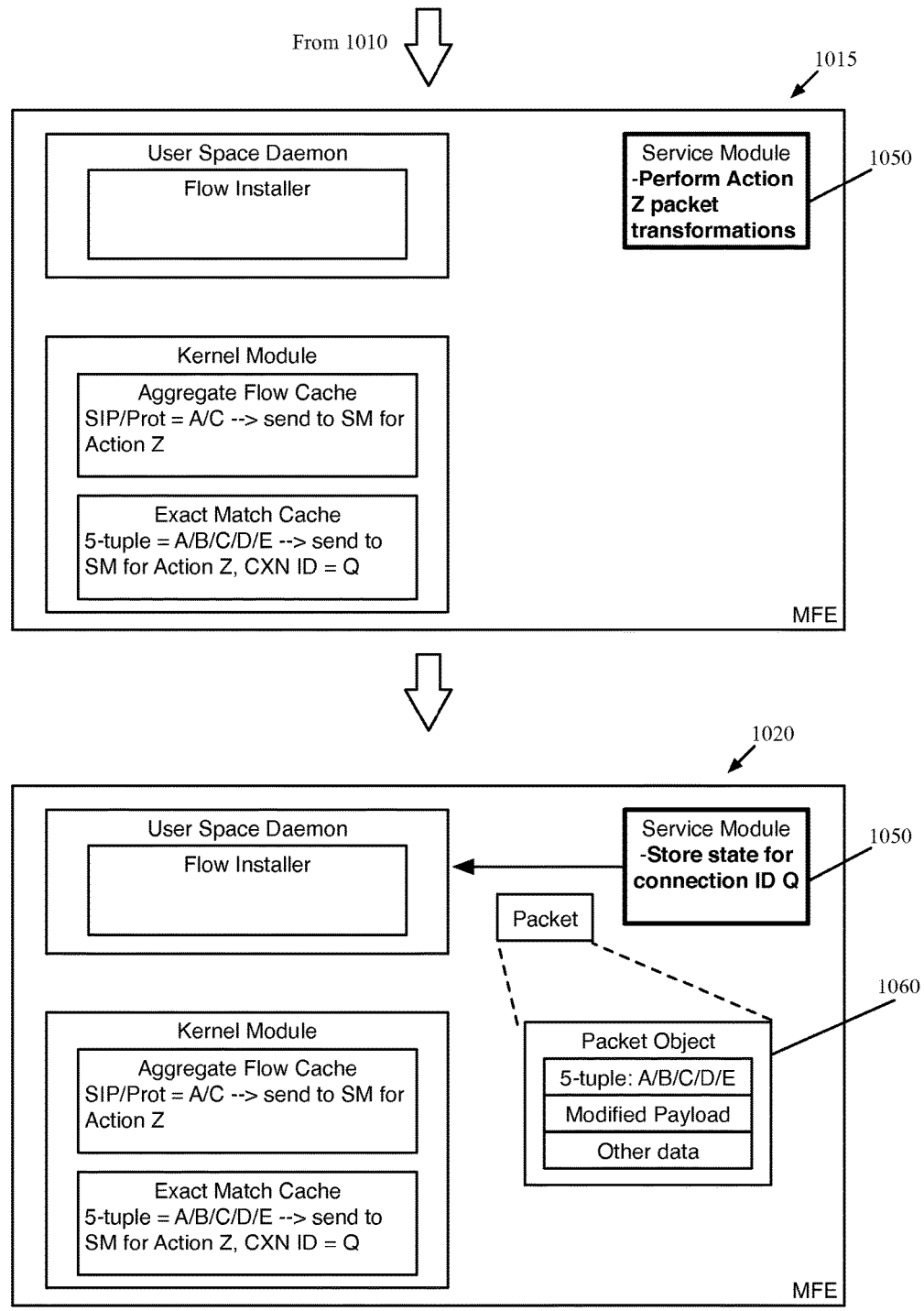
Figure 11:
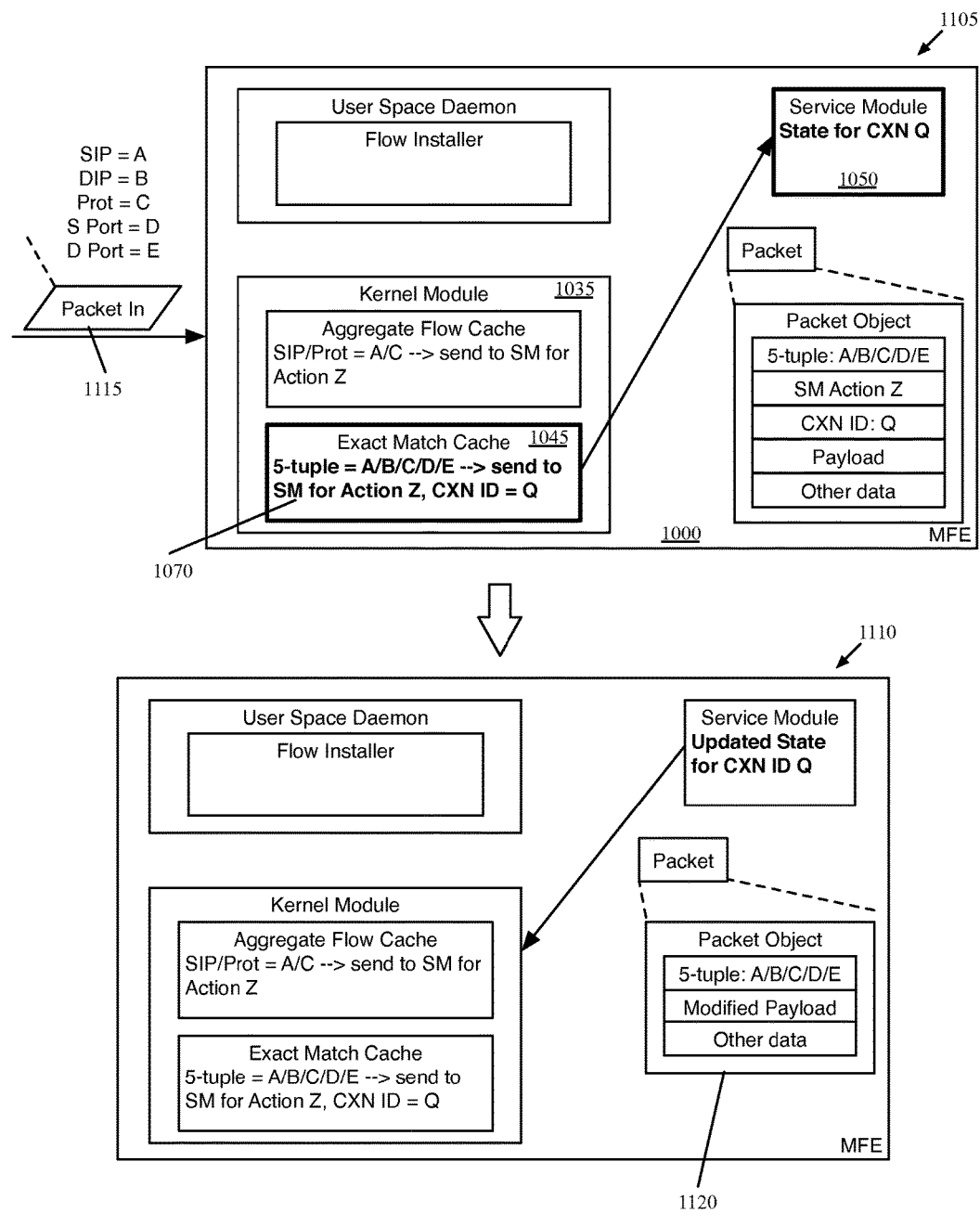
FIG. 11 conceptually illustrates the processing of a second packet of the same connection as the first packet from FIGS. 10A-B.

FIGS. 10-12 conceptually illustrate the processing of several packets by an MFE 1000 and service module 1050 of some embodiments. Specifically, these examples illustrate the building up and use of cached flow entries by the MFE 1000 over the course of three packets that are sent to the service module 1050. FIGS. 10A and 10B illustrate the processing of a first packet by the MFE 1000 over four stages 1005-1020. The MFE 1000 includes a user space daemon 1025 with a flow installer 1030, and a kernel module 1035 with an aggregate flow cache 1040 and an exact-match cache 1045. In some embodiments, these components operate in the same or similar manner to the corresponding components of the MFEs of FIG. 3 and FIG. 1, described above.

In addition, the MFE includes a service module 1050. This service module 1050 is shown as part of the MFE 1000 in this example, though in other embodiments the service module operates separately within the same virtualization software as the MFE, or in a separate VM, namespace, or other data compute node on the same host machine as the MFE 1000. The service module 1050 performs a service that operates at the L4-L7 level rather than the L2/L3 level of the packet classifiers. For example, the service module 1050 might be a firewall module for making stateful decisions about whether to allow or block packets (which requires examining at least the L4 headers), a SNATP module for assigning source IP addresses and source ports for new connections, a load balancer that examines http headers in order to perform its load balancing, an IPsec encryptor, or other middlebox-type element. In this example, the service module 1050 performs payload modifications, but in a deterministic manner (e.g., the same payload modifications are performed to all packets having certain characteristics that may be offloaded to the packet classifiers of the MFE, in this case the same source IP address and transport protocol).

The first stage 1005 of FIG. 10 illustrates the MFE 1000 receiving a packet 1055. This packet has a source IP (SIP) of A, a destination IP (DIP) of B, a transport protocol (Prot) of C, a source transport port (S Port) of D, and a destination transport port (D Port) of E, among other header fields (these are the standard five fields that make up a 5-tuple that defines a connection). This packet may be received from a VM or other data compute node operating on the same host machine as the MFE or from an external machine through a NIC of the host machine.

As the exact match and aggregate flow caches are currently unpopulated (e.g., because the machine on which the MFE operates has recently been powered on), the user space daemon 1025 performs a full set of classification lookups over the staged forwarding tables, which include matches over the SIP and Prot fields of the packet (possibly including other fields). These lookups result in a final action specifying to send the packet to the service module 1050 and for the service module to perform Action Z on the packet (i.e., an identifier with which the service module can determine what specific actions to perform, possibly based on the connection state).

The second stage 1010 illustrates that a packet object 1060 is passed to the service module 1050 for processing. This packet object includes the 5-tuple (A/B/C/D/E), as well as the payload of the packet and other data (e.g., other header fields, etc.). Furthermore, the packet object 1060 stores out-of-band information, including the service module action identifier (Action Z) and a newly-assigned connection identifier Q. As described above, in some embodiments the packet processors assign the connection identifier used to keep track of per-connection state, while in other embodiments the service module assigns this information and informs the packet processor.

In the second stage 1010, the flow installer 1030 also installs new flow entries 1065 and 1070 into the aggregate flow cache 1040 and the exact-match cache 1045, respectively. As shown, the exact-match flow entry 1070 specifies a match over the entire five-tuple (A/B/C/D/E) of the packet 1055 (as well as other fields of the packet headers, not shown), whereas the aggregate cache entry 1065 specifies a match over only the SIP (A) and Prot (C) fields that affected the outcome for the packet as processed by the flow installer (as well as any other fields that affected this outcome). Both of the newly installed flow entries specify to send the packet to the service module 1050 for Action Z. However, the exact-match entry 1050 specifies the connection identifier (Q) assigned for the connection to which the packet 1055 belongs as well, so that subsequent packets that match this entry will have the same connection identifier when sent to the service module 1050.

As indicated above, in some embodiments the MFE only generates an aggregate cache flow entry at this stage. That is, the flow installer would install only the new flow entry 1065 in the aggregate flow cache. A subsequent packet with the five-tuple (A/B/C/D/E) would result in the generation of the exact-match flow entry 1070 based on the matched aggregate flow entry 1065.

The third stage 1015 illustrates that the service module processes the packet according to the action identifier Z passed along with the packet and its service configuration. That is, in some embodiments the action identifier passed by the classifier enables the service module to quickly determine what action to take according to its configuration. In an example such as SNATP, this action identifier might point directly to the configuration the SNATP module would use (e.g., the public source IP to use for packets sent from the source IP of the packet). For some service modules (e.g., a firewall), the actions will also be dependent on the payload and current connection state. For example, a firewall will not generally allow a returning SYN-ACK packet (determined by inspecting the payload data) unless a forward-direction SYN packet for the same connection has previously been seen by the firewall (determined by the stored connection state).

In the fourth stage 1020, the service module 1050 stores state for the connection Q, and returns the packet object 1060 to the MFE classifier for additional processing. Because this is the first packet in a connection and the traffic aggregate flow cache has not been built up yet, the processing will likely be again performed by the flow installer. While the SIP and Prot fields would match the flow entry 1065, the ingress port will be different as the MFE treats the returning packet object 1060 as a new packet in some embodiments (received from a port defined for the software abstraction between the MFE classifier and the service module). As shown, the packet object 1060 has a payload modified based on the packet transformations performed by the service module. In addition, in this example, the packet object no longer carries the connection identifier and service module action identifier, as these are not necessary for the classifier packet processing.

FIG. 11 conceptually illustrates the processing of a second packet 1115 of the connection over two stages 1105-1110 of the MFE 1000. In the first stage 1105, the MFE 1000 receives the packet 1115, which has the same five-tuple A/B/C/D/E as the first packet 1055, and is received via the same ingress port. The kernel module 1035 initially performs a lookup in the exact-match cache 1045 (e.g., using a hash lookup), and finds that the incoming packet 1115 matches the cached flow entry 1070 (because it has the same packet header values as the first packet that caused the creation of this exact-match entry).

With the match found, the MFE sends the packet 1115 to the service module (using a created packet object 1120). This packet object is similar to the object 1060, storing the same 5-tuple and other header data, and the same identifiers (service action identifier Z and connection identifier Q). However, the payload data might be different For instance, if the first packet 1055 was a SYN packet to establish a TCP connection, the second packet 1115 might be an ACK packet sent after a SYN-ACK packet was received by the initiator of the connection.

The first stage 1105 also shows that the service module 1050 accesses the stored state for the connection Q upon receiving the packet (without the need to perform a separate lookup over the 5-tuple or other packet headers to identify that the packet is from the same connection as the previous packet 1055). The service module 1050 uses this stored state and the action identifier to perform the appropriate packet transformations or other operations on the packet.

In the second stage 1110, the service module 1050 sends the packet object 1120 back to the MFE classifier. This packet also has a modified payload based on the transformations applied by the service module 1050 (and has had the service actions identifier and connection identifier removed), and is treated by the classifier of the MFE as a new packet in some embodiments. Because of the previous packet returned by the service module for this connection, an exact-match cache entry should exist for the returning packet as well.

Figure 12A:
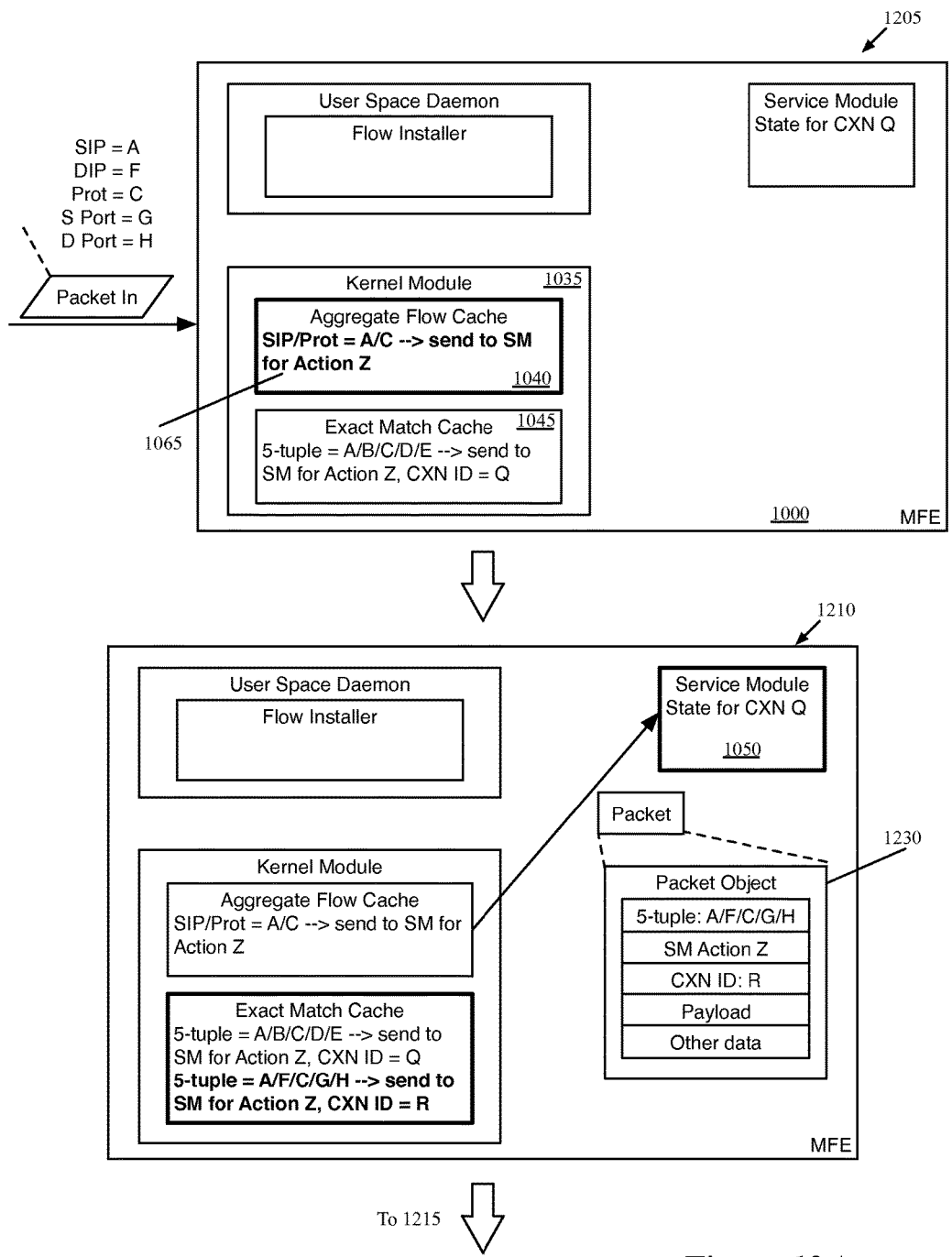
FIGS. 12A-B conceptually illustrate the processing of a third packet that falls into the same traffic aggregate class as the first packet but is from a different data flow.
Figure 12B:
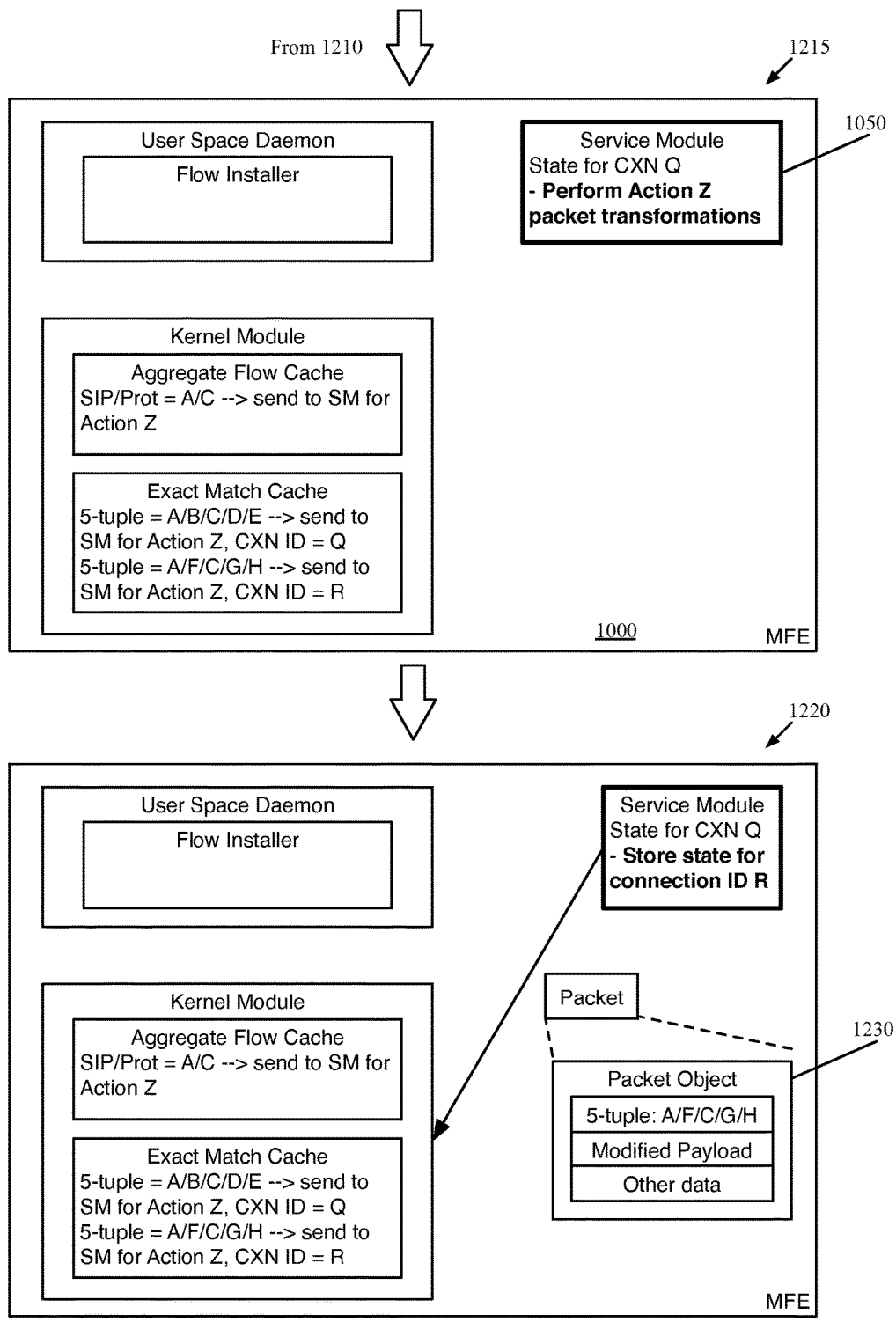

FIGS. 12A-B conceptually illustrate the processing of a third packet 1225 by the MFE 1000 that falls into the same traffic aggregate class as the packet 1055 but is from a different data flow, over four stages 1205-1220. As shown, the first stage 1205 illustrates the MFE 1000 receiving the third packet 1225, which has a 5-tuple of A/F/C/G/H. That is, the SIP and Prot fields are the same as the initial packet 1055, but the DIP, S Port, and D Port fields have different values (e.g., because the packet is from the same source VM, but sent from a different port to a different destination). The first stage 1205 also illustrates that as a result of the SIP (A) and Prot (C) field values, the kernel module 1035 identifies a matching flow entry 1065 in the aggregate flow cache 1040 (after failing to find a matching flow entry in the exact-match cache 1045). This matching flow entry specifies to send the packet to the service module with action identifier Z, but does not indicate a connection identifier to use.

Thus, at the second stage 1210, the MFE sends the packet 1225 to the service module 1050 by passing a packet object 1230 to the service module. This packet object is similar in structure to the packet object 1060, but has a different 5-tuple (A/F/C/G/H) and connection identifier (because the packet is part of a different connection). The other data might be at least partly the same (e.g., the same source and destination MAC addresses), and the payload might be similar as well (both packets could be TCP SYN packets, being the first packet in a connection). In addition, the same action identifier Z is contained in the packet, to instruct the service module to use the same action configuration as for the previous connection.

The second stage 1210 also illustrates that the MFE installs a new flow entry 1235 in the exact-match cache 1045. As shown, the exact-match flow entry 1235 specifies a match over the entire 5-tuple (A/F/C/G/H) of the packet 1225 as well as other fields of the packet headers that are not shown), and specifies to send the packet to the service module 1050 for Action Z. Furthermore, because this is an exact-match entry for a specific connection, the flow entry specifies to use the connection identifier R assigned for that specific connection, so that subsequent packets that match the flow entry will have the same connection identifier when sent to the service module 1050.

The third stage 1215 illustrates that the service module processes the packet according to the action identifier Z passed along with the packet and its service configuration. That is, in some embodiments the action identifier passed by the classifier enables the service module to quickly determine what action to take according to its configuration. In an example such as SNATP, this action identifier might point directly to the configuration the SNATP module would use (e.g., the public source IP to use for packets sent from the source IP of the packet). For some service modules (e.g., a firewall), the actions will also be dependent on the payload and current connection state. For example, a firewall will not generally allow a returning SYN-ACK packet (determined by inspecting the payload data) unless a forward-direction SYN packet for the same connection has previously been seen by the firewall (determined by the stored connection state).

In the fourth stage 1220, the service module 1050 stores state for the new connection R, and returns the packet object 1230 to the MFE classifier for additional processing. As shown, the packet object 1060 has a payload modified based on the packet transformations performed by the service module. In addition, in this example, the packet object no longer carries the connection identifier and service module action identifier, as these are not necessary for the classifier packet processing.

In the example of FIGS. 10-12, the service module 1050 could perform its packet transformations without any classification operations necessary, as the L2/L3 headers inspected by the MFE classifier were sufficient to instruct the service module on what operations to perform. Even if the packet required additional inspection of the payload (e.g., for a firewall), each packet was treated on its own based on the connection state and the specified action. However, for some network services, the service module may include two (or more) different paths, just as the classifier has a fast path (cached flow entries in the kernel space) and slow path (staged forwarding tables in the user space). In some embodiments, even when a packet matches an exact-match entry in the classifier, the service module may need to use its slow path to process the packet.

For example, a load balancer that performs DNAT and operates at the HTTP level to execute HTTP header translations may have both a fast path and a slow path. In this example, the slow path of the load balancer module is responsible for reconstructing a TCP payload stream as well as parsing and modifying the HTTP headers. Thus, even if a packet has an exact-match hit in the cache of the classifier, the load balancer module may internally require involved TCP/HTTP packet operations, as well as running a TCP state machine to reconstruct and modify the payload. However, once the HTTP headers have been parsed, the load balancer can revert to fast path operations for subsequent packets. For example, if the load balancer knows how many bytes are coming for a particular request, as well as how to modify the TCP sequence numbers, destination IP, destination port number, etc., it does not have to parse the subsequent packets for that same request (and can determine how many packets will be sent for the request). Once the sufficient number of bytes of payload have passed through, the load balancer can use the slow path for the next request.

Figure 13A:
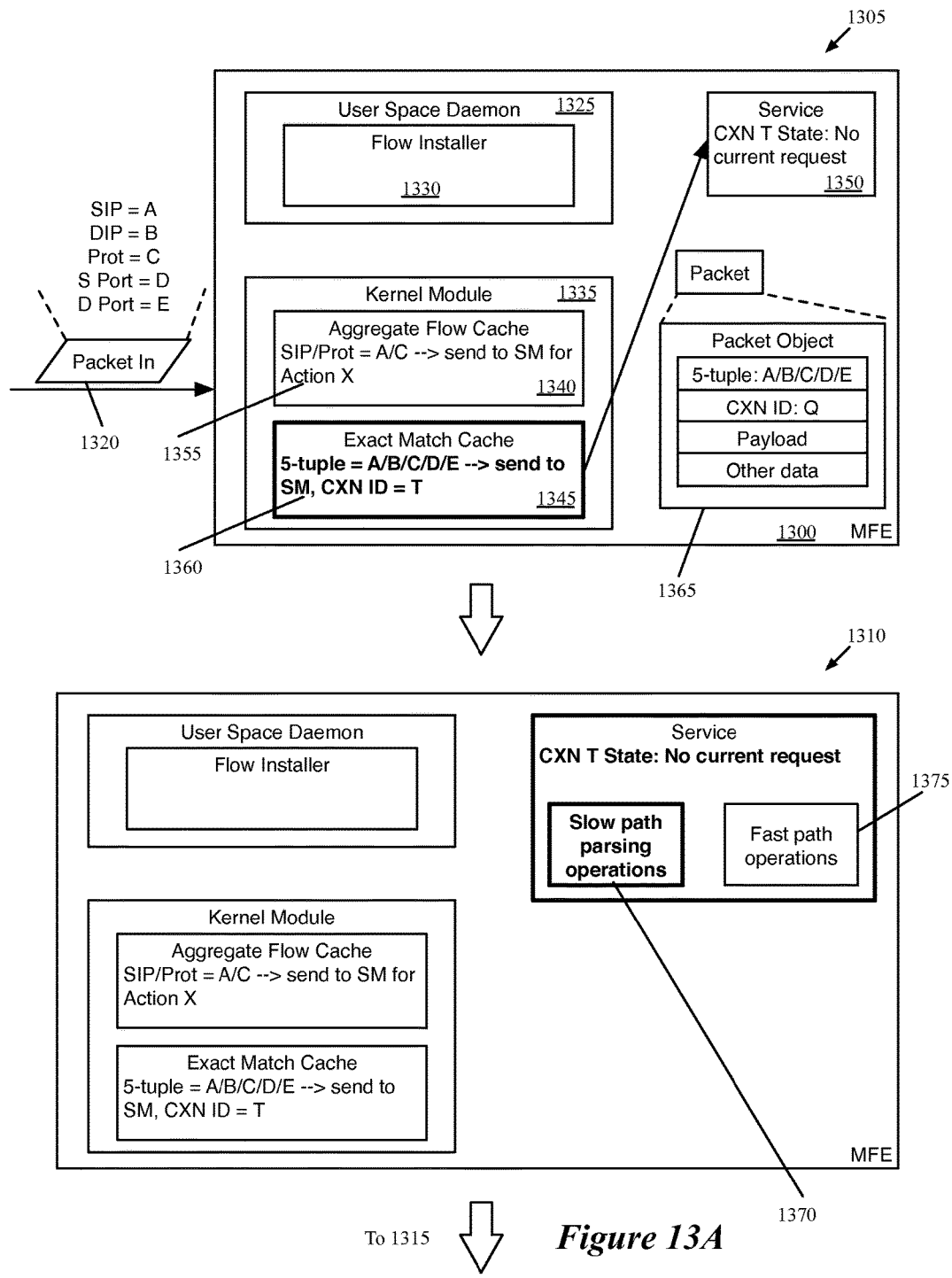
FIGS. 13A-B illustrate the processing of a first packet by the slow path of a network service.
Figure 13B:
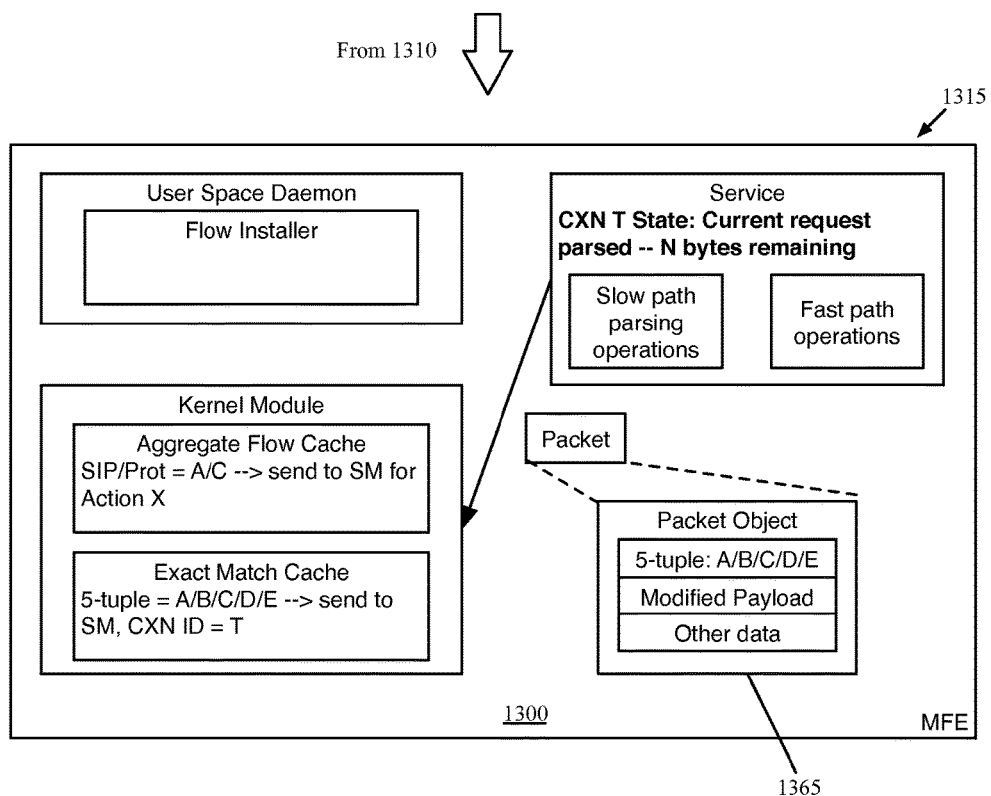

FIGS. 13 and 14 conceptually illustrate two packets sent to such a service module with a fast path and a slow path in a MFE 1300. FIGS. 13A-B illustrate the processing of a first packet 1320 by the slow path of the service 1350, over three stages 1305-1315. The MFE 1300, as shown, includes a user space daemon 1325 with a flow installer 1330, and a kernel module 1335 with an aggregate flow cache 1340 and an exact-match cache 1345. In some embodiments, these components operate in the same or similar manner to the corresponding components of the MFEs of FIG. 3 and FIG. 1, described above.

In addition, the MFE includes a service module 1350. This service module 1350 is shown as part of the MFE 1300 in this example, though in other embodiments the service module operates separately within the same virtualization software as the MFE, or in a separate VM, namespace, or other data compute node on the same host machine as the MFE 1000. Like the above example, the service module 1350 performs a service that operates at the L4-L7 level rather than the L2/L3 level of the packet classifiers. In this case, as shown in stages 1310 and 1315, the service module has a fast path and a slow path, and the current state of a particular connection might result in processing by either the fast path or slow path, even when a matching flow entry is found in the exact-match cache 1320. For example, the service module 1350 might be a load balancer that operates at the HTTP level, as described above.

The first stage 1305 illustrates the MFE 1300 receiving a packet 1320, with a 5-tuple of A/B/C/D/E. As shown in the kernel space classifier caches 1340 and 1345, this packet is not the first packet in a connection. Thus, the aggregate flow cache 1340 and the exact-match cache 1345 both have flow entries for the traffic aggregate class (flow entry 1355) and the specific connection (flow entry 1360). As shown, the aggregate flow entry 1355 specifies to send the packet to the service module for Action X (based on the source IP and protocol fields, possibly among others) while the exact-match cache flow entry 1360 specifies to send the packet to the service module with connection identifier T. In some embodiments, for any type of service module, the exact-match entry does not need to specify the action or point to a configuration for the service module to use for a packet, because it will have already established state information that contains this information, and the connection identifier enables the service module to identify the state and determine the action to take.

In this case, because the kernel module 1335 checks the exact-match cache 1345 first, the packet matches the flow entry 1360. This results in sending a packet object 1365 to the service module 1350. As shown, this service module already stores state information for the connection T to which the packet 1320 belongs. This state currently identifies that there is not a request currently being processed for the connection T.

The second stage 1310 illustrates that, based on the connection identifier T attached to the packet object 1365 and the state stored by the service module for the connection T, the service module uses its slow path parsing operations 1370 rather than its fast path operations to perform the necessary services on the packet. For example, as described above, a HTTP-level load balancer might parse the payload of the packet to inspect its TCP and HTTP headers (these headers being considered payload from a L2/L3 classifier perspective) and determine how to modify TCP sequence numbers and other information, how many bytes will be coming for the same request (which should receive similar treatment via the fast path 1375), and other information.

In the third stage 1315, after performing these slow path parsing operations and performing the necessary packet modifications, the service module 1350 returns the packet object 1365 to the MFE classifier, with a modified payload. Furthermore, the service module 1350 updates its state for connection T to indicate that it is processing a current request for this connection, which has N bytes remaining.

Figure 14A:
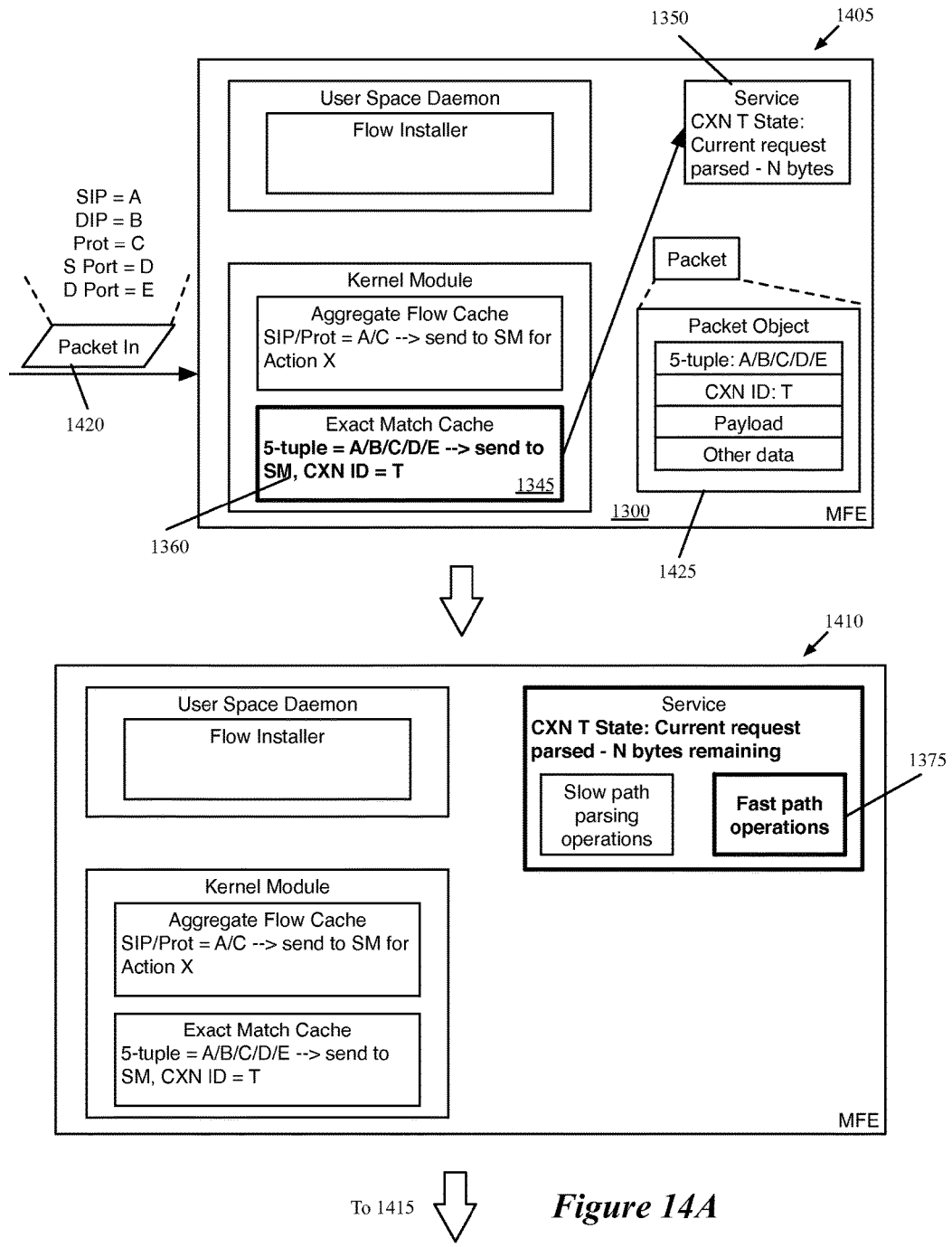
FIGS. 14A-B illustrate the processing of a second packet by the fast path of the network service.
Figure 14B:
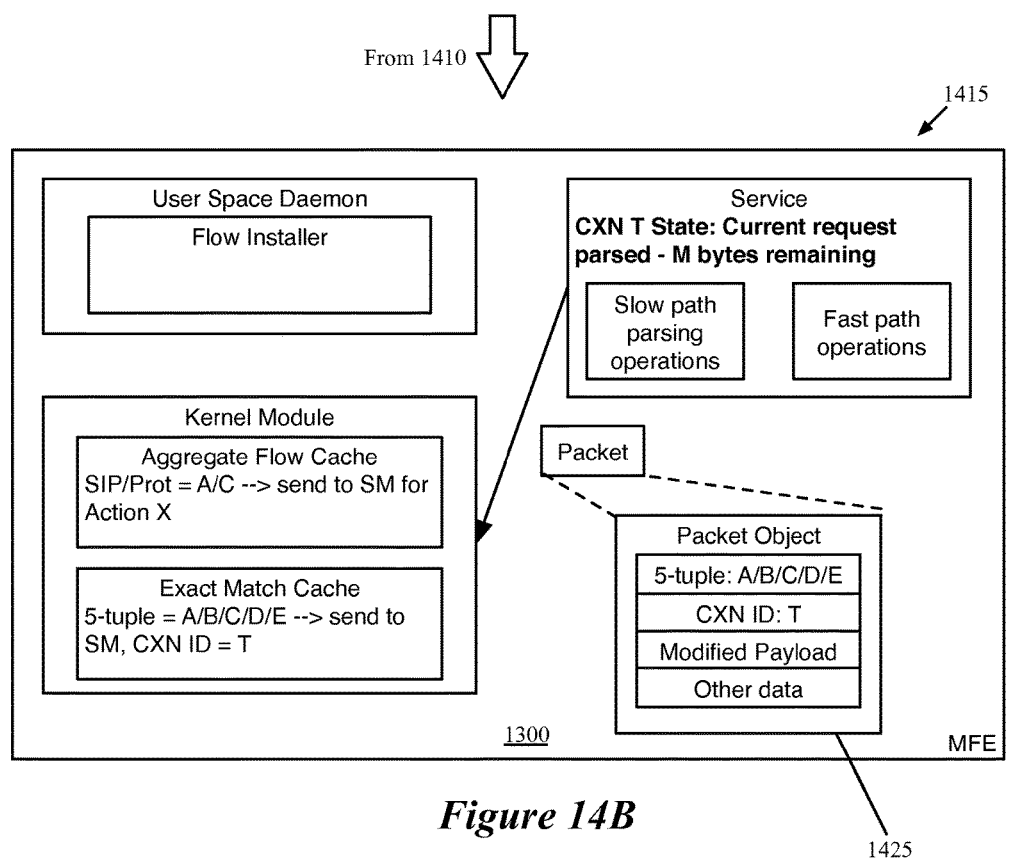

FIGS. 14A-B illustrates the processing of a second packet 1420 over three stages 1405-1415 of the MFE 1300. The first stage 1405 is similar to the first stage 1305 of FIG. 13. That is, the MFE 1300 receives the packet 1420 with a 5-tuple of A/B/C/D/E, finds the flow entry 1360 in the exact-match cache 1345, and sends a packet object 1425 to the service module 1350. The difference in this case is that the packet will (presumably) have a different payload, and the current state stored by the service module 1350 for connection T indicates that a current request has been parsed and there are N bytes remaining for the request.

The second stage 1410 illustrates that the service module accesses the state for connection T upon receiving the packet, and uses its fast path operations 1375 to process the packet 1420 rather than reverting to the slow path for this packet. In the third stage 1415, the service module 1350 returns the packet object 1425 to the classifier of the MFE 1300 with a modified payload, and updates its state for connection T to indicate that there are now M bytes remaining for the current request (where M<N). Subsequent packets for connection T would be processed similarly by the service module, until the request was completed.

It should be understood that the previous two examples are not intended to be exhaustive of all of the configurations of the network services and the ways in which the network services might use the flow caches of the classifier to offload classification operations. For example, in certain cases, the cached flow entries might specify actions to be performed by multiple services in a sequence, without the need for intermediate classification operations (e.g., when the operations for the services to perform do not modify the L2/L3 packet headers).

As a specific example of another service, Secure Sockets Layer (SSL) that encrypts a packet above the TCP/IP headers (e.g., above L4) might use hardware acceleration for its payload transformations. That is, for at least the fast path of the SSL middlebox, the service could offload the encryption to an encryption ASIC in some embodiments. Because the classification operations don't inspect the headers above L4, all of the caching both before and after the network service could be implemented in the same manner.

In some embodiments, when the internal state of a service is updated (e.g., a modification to the configuration of a service), cached forwarding decisions may need to be revoked. For example, if a service module modifies packet headers according to its internal configuration, then classification operations applied to the packet after its return from the service may need to be revoked. Accordingly, some embodiments allow the services to add tags to both exact match and aggregate cache flow entries, and later revoke the entries having specific tags. However, certain types of services may have very dynamic internal configurations, and therefore the cost of constantly revoking cache entries may become prohibitive compared to the savings of using the caches (e.g., a http load balancer parsing a TCP content stream which selects the server to which to send each request based on dynamic server load). Thus, some embodiments use a reclassification function that alerts the MFE to perform reclassification after the service module, even if executed within the cache.

IV. Electronic System

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 15:
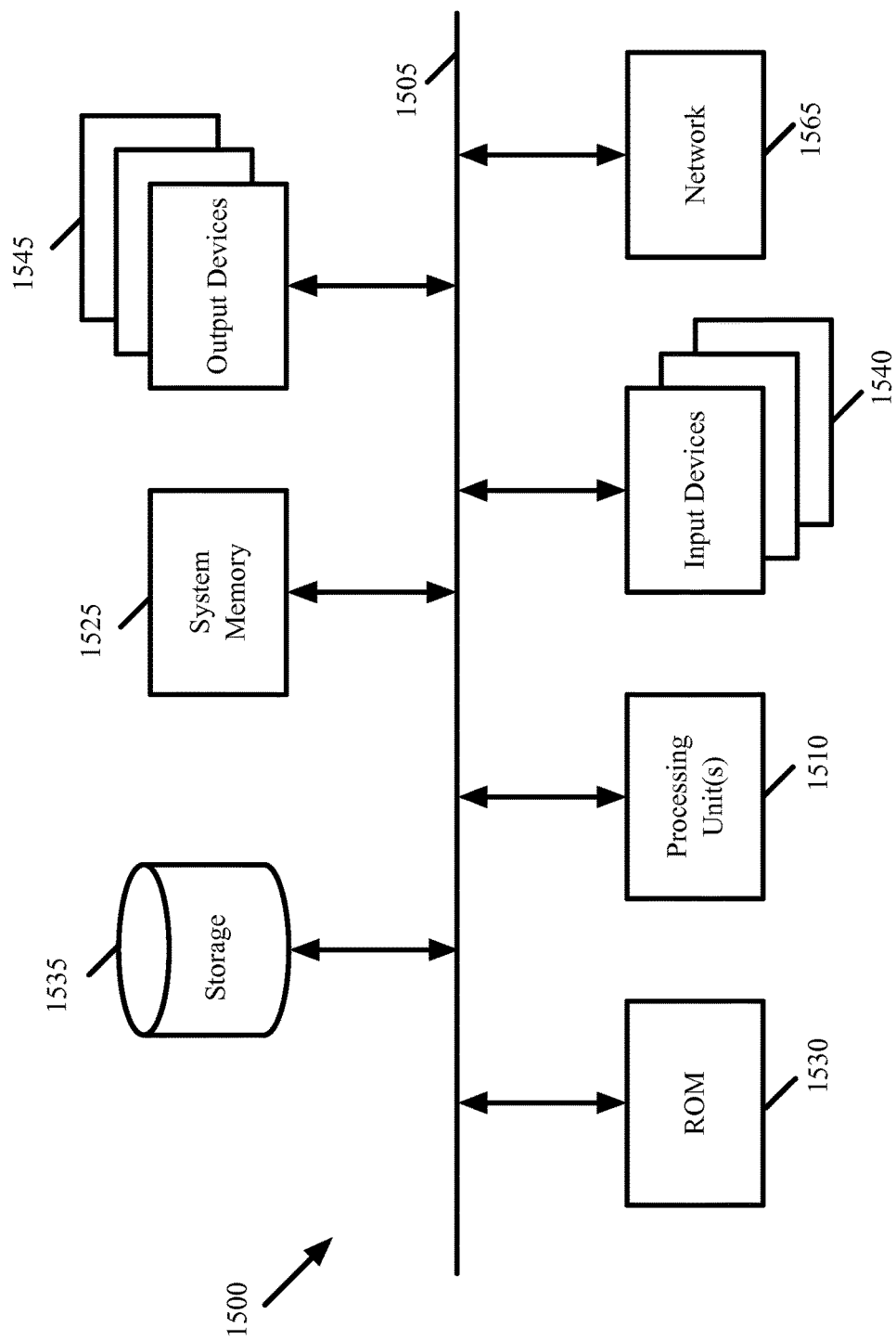
FIG. 15 conceptually illustrates an electronic system with which some embodiments of the invention are implemented.

FIG. 15 conceptually illustrates an electronic system 1500 with which some embodiments of the invention are implemented. The electronic system 1500 can be used to execute any of the control, virtualization, or operating system applications described above. The electronic system 1500 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 1500 includes a bus 1505, processing unit(s) 1510, a system memory 1525, a read-only memory 1530, a permanent storage device 1535, input devices 1540, and output devices 1545.

The bus 1505 collectively represents all system, peripheral, and chipset buses that communicatively connect the numerous internal devices of the electronic system 1500. For instance, the bus 1505 communicatively connects the processing unit(s) 1510 with the read-only memory 1530, the system memory 1525, and the permanent storage device 1535.

From these various memory units, the processing unit(s) 1510 retrieve instructions to execute and data to process in order to execute the processes of the invention. The processing unit(s) may be a single processor or a multi-core processor in different embodiments.

The read-only-memory (ROM) 1530 stores static data and instructions that are needed by the processing unit(s) 1510 and other modules of the electronic system. The permanent storage device 1535, on the other hand, is a read-and-write memory device. This device is a non-volatile memory unit that stores instructions and data even when the electronic system 1500 is off. Some embodiments of the invention use a mass-storage device (such as a magnetic or optical disk and its corresponding disk drive) as the permanent storage device 1535.

Other embodiments use a removable storage device (such as a floppy disk, flash drive, etc.) as the permanent storage device. Like the permanent storage device 1535, the system memory 1525 is a read-and-write memory device. However, unlike storage device 1535, the system memory is a volatile read-and-write memory, such a random access memory. The system memory stores some of the instructions and data that the processor needs at runtime. In some embodiments, the invention's processes are stored in the system memory 1525, the permanent storage device 1535, and/or the read-only memory 1530. From these various memory units, the processing unit(s) 1510 retrieve instructions to execute and data to process in order to execute the processes of some embodiments.

The bus 1505 also connects to the input and output devices 1540 and 1545. The input devices enable the user to communicate information and select commands to the electronic system. The input devices 1540 include alphanumeric keyboards and pointing devices (also called "cursor control devices"). The output devices 1545 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 15, bus 1505 also couples electronic system 1500 to a network 1565 through a network adapter (not shown). In this manner, the computer can be a part of a network of computers (such as a local area network ("LAN"), a wide area network ("WAN"), or an Intranet, or a network of networks, such as the Internet. Any or all components of electronic system 1500 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion relates primarily to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

This specification refers throughout to computational and network environments that include virtual machines (VMs). However, virtual machines are merely one example of data compute nodes (DCNs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses name spaces to isolate the containers from each other and therefore provides operating-system level segregation of the different groups of applications that operate within different containers. This segregation is akin to the VM segregation that is offered in hypervisor-virtualized environments that virtualize system hardware, and thus can be viewed as a form of virtualization that isolates different groups of applications that operate in different containers. Such containers are more lightweight than VMs.

Hypervisor kernel network interface modules, in some embodiments, is a non-VM DCN that includes a network stack with a hypervisor kernel network interface and receive/transmit threads. One example of a hypervisor kernel network interface module is the vmknic module that is part of the ESXi™ hypervisor of VMware, Inc.

It should be understood that while the specification refers to VMs, the examples given could be any type of DCNs, including physical hosts, VMs, non-VM containers, and hypervisor kernel network interface modules. In fact, the example networks could include combinations of different types of DCNs in some embodiments.

While the invention has been described with reference to numerous specific details, it should be understood that the invention can be embodied in other specific forms without departing from the spirit of the invention. In addition, a number of the figures (including FIGS. 2 and 9) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, it should be understood that the invention is not to be limited by the foregoing illustrative details, but rather is to be defined by the appended claims.

The invention claimed is:

1. A method for processing a packet received by a managed forwarding element, the method comprising:
performing an ordered series of lookups into a plurality of flow tables based on a set of header values of the received packet, the ordered series of lookups for determining a next destination of the received packet and specifying a plurality of actions to perform on the received packet; and
when the ordered series of lookups specifies sending the packet to a network service that performs payload transformations on the packet:
assigning a service operation identifier to the packet that identifies the service operations for the network service to perform on the packet;
sending the packet to the network service with the service operation identifier; and
for subsequent packets that should be processed like the received packet, storing a cache entry that specifies the plurality of actions to be performed on the subsequent packets without requiring the ordered series of lookups into the flow tables, the cache entry comprising the assigned service operation identifier,
wherein the network service uses the assigned service operation identifier to process packets without performing its own classification operations.

2. The method of claim 1, wherein the ordered series of lookups comprise at least one of layer 2 ("L2") and layer 3 ("L3") forwarding operations, and the network service performs at least one of layer 4 ("L4"), layer 5 ("L5"), layer 6 ("L6"), and layer 7 ("L7") operations.

3. The method of claim 1, wherein the network service is performed by the managed forwarding element.

4. The method of claim 1, wherein the managed forwarding element operates within virtualization software of a host machine, wherein the ordered series of lookups are performed in a user space of the virtualization software and the cache entry is stored in a kernel of the virtualization software.

5. The method of claim 4, wherein the subsequent packets are packets in a same data flow as the received packet and are processed only in the kernel.

6. The method of claim 1 further comprising:
receiving a second packet that belongs to a same data flow as the received packet;
processing the second packet using the plurality of actions specified in the cache entry; and
sending the packet to the network service with the service operation identifier.

7. The method of claim 1 further comprising creating an object to represent the packet for the managed forwarding element, wherein the service operation identifier is stored as an attribute of the packet object.

8. The method of claim 7, wherein sending the packet to the network service comprises calling a network service module with the packet object as a parameter.

9. The method of claim 1 further comprising assigning a connection identifier to the packet that identifies the packet as part of a particular transport layer connection, wherein the packet is sent to the network service with the connection identifier.

10. The method of claim 9, wherein the stored cache entry further comprises the connection identifier, the stored cache entry for sending the subsequent packets of the particular transport layer connection to the network service with the connection identifier.

11. The method of claim 10, wherein the network service performs stateful operations and uses the assigned connection identifier to apply state stored for the particular transport layer connection to the subsequent packets.

12. A non-transitory machine readable medium storing a managed forwarding element which when executed by at least one processing unit processes packets for a network, the managed forwarding element comprising sets of instructions for:
performing an ordered series of lookups into a plurality of flow tables based on a set of header values of the received packet, the ordered series of lookups for determining a next destination of the received packet and specifying a plurality of actions to perform on the received packet; and
when the ordered series of lookups specifies sending the packet to a network service that performs payload transformations on the packet:
assigning a service operation identifier to the packet that identifies the service operations for the network service to perform on the packet;
sending the packet to the network service with the service operation identifier; and
for subsequent packets that should be processed like the received packet, storing a cache entry that specifies the plurality of actions to be performed on the subsequent packets without requiring the ordered series of lookups into the flow tables, the cache entry comprising the assigned service operation identifier,
wherein the network service uses the assigned service operation identifier to process packets without performing its own classification operations.

13. The non-transitory machine readable medium of claim 12, wherein the ordered series of lookups comprise at least one of layer 2 ("L2") and layer 3 ("L3") forwarding operations, and the network service performs at least one of layer 4 ("L4"), layer 5 ("L5"), layer 6 ("L6"), and layer 7 ("L7") operations.

14. The non-transitory machine readable medium of claim 12, wherein the network service operates on a same host machine as the managed forwarding element.

15. The non-transitory machine readable medium of claim 12, wherein the managed forwarding element further comprises sets of instructions for:
receiving a second packet that belongs to a same data flow as the received packet;
processing the second packet using the plurality of actions specified in the cache entry; and
sending the packet to the network service with the service operation identifier.

16. The non-transitory machine readable medium of claim 12, wherein the managed forwarding element further comprises sets of instructions for creating an object to represent the packet for the managed forwarding element, wherein the service operation identifier is stored as an attribute of the packet object.

17. The non-transitory machine readable medium of claim 16, wherein the set of instructions for sending the packet to the network service comprises a set of instructions for calling a network service module with the packet object as a parameter.

18. The non-transitory machine readable medium of claim 12, wherein the managed forwarding element further comprises a set of instructions for assigning a connection identifier to the packet that identifies the packet as part of a particular transport layer connection, wherein the packet is sent to the network service with the connection identifier.

19. The non-transitory machine readable medium of claim 18, wherein the stored cache entry further comprises the connection identifier, the stored cache entry for sending the subsequent packets of the particular transport layer connection to the network service with the connection identifier.

20. The non-transitory machine readable medium of claim 19, wherein the network service performs stateful operations and uses the assigned connection identifier to apply state stored for the particular transport layer connection to the subsequent packets.

* * * * *